(12) United States Patent
Ono

(10) Patent No.: US 12,296,620 B2
(45) Date of Patent: May 13, 2025

(54) TIRE

(71) Applicant: SUMITOMO RUBBER INDUSTRIES, LTD., Hyogo (JP)

(72) Inventor: Shuichiro Ono, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 81 days.

(21) Appl. No.: 18/001,836

(22) PCT Filed: Feb. 18, 2021

(86) PCT No.: PCT/JP2021/006170
§ 371 (c)(1),
(2) Date: Dec. 14, 2022

(87) PCT Pub. No.: WO2021/261009
PCT Pub. Date: Dec. 30, 2021

(65) Prior Publication Data
US 2023/0226857 A1    Jul. 20, 2023

(30) Foreign Application Priority Data

Jun. 24, 2020 (JP) ................. 2020-108985

(51) Int. Cl.
*B60C 11/00* (2006.01)
*B60C 11/03* (2006.01)
*B60C 11/13* (2006.01)

(52) U.S. Cl.
CPC ........ *B60C 11/1307* (2013.01); *B60C 11/005* (2013.01); *B60C 11/033* (2013.01); *B60C 2011/0016* (2013.01); *B60C 2011/133* (2013.01)

(58) Field of Classification Search
CPC ............... B60C 11/1307; B60C 11/005; B60C 11/033; B60C 2011/133; B60C 2011/0016
See application file for complete search history.

(56) References Cited

U.S. PATENT DOCUMENTS

2008/0149237 A1* 6/2008 Cambron ............ B60C 11/0323
152/154.2
2010/0084063 A1    4/2010 Koutoku
(Continued)

FOREIGN PATENT DOCUMENTS

CN          105960338 A     9/2016
EP          3 461 656 A1    4/2019
(Continued)

OTHER PUBLICATIONS

Machine translation for Japan 2005-067236 (Year: 2024).*
(Continued)

*Primary Examiner* — Steven D Maki
(74) *Attorney, Agent, or Firm* — Studebaker Brackett PLLC

(57) ABSTRACT

An object of the invention is to provide a tire having little change in riding comfort performance and wet performance before and after wear of the tread part and in which riding comfort performance and wet performance as when the tire is newly used are maintained. The tire comprises a tread being composed of a rubber layer in which there is little change in hardness after thermal deterioration and having a groove shape such that a sea ratio after wear with respect to a sea ratio as when the tire is newly used is within a predetermined range.

16 Claims, 6 Drawing Sheets

(56) References Cited

U.S. PATENT DOCUMENTS

| | | | |
|---|---|---|---|
| 2017/0001478 A1 | | 1/2017 | Rolland et al. |
| 2017/0174008 A1 | | 6/2017 | Marlier et al. |
| 2019/0039421 A1 | * | 2/2019 | Nakajima ............ B60C 11/042 |
| 2019/0061435 A1 | | 2/2019 | Kajita |
| 2021/0039437 A1 | | 2/2021 | Oka |
| 2021/0332221 A1 | * | 10/2021 | Nakamura ............ B60C 1/0016 |
| 2022/0017729 A1 | * | 1/2022 | Kitago ...................... C08L 9/06 |

FOREIGN PATENT DOCUMENTS

| | | | | |
|---|---|---|---|---|
| EP | 4166354 A1 | * | 4/2023 | |
| JP | H09-150605 A | | 6/1997 | |
| JP | H11-342709 A | | 12/1999 | |
| JP | 2003-176379 A | | 6/2003 | |
| JP | 2005-067236 A | * | 3/2005 | |
| JP | 2008-049958 A | | 3/2008 | |
| JP | 2008-222162 A | | 9/2008 | |
| JP | 2016-124442 A | | 7/2016 | |
| JP | 2017-505261 A | | 2/2017 | |
| JP | 2019-026241 A | | 2/2019 | |
| JP | 2019-038341 A | | 3/2019 | |
| JP | 2019-098998 A | | 6/2019 | |
| JP | 2020-079336 A | | 5/2020 | |
| WO | 2019/151521 A1 | | 8/2019 | |
| WO | WO-2020/059302 A1 | * | 3/2020 | |
| WO | WO-2020/100492 A1 | * | 5/2020 | |
| WO | WO-2021/256123 A1 | * | 12/2021 | |

OTHER PUBLICATIONS

An Office Action mailed by China National Intellectual Property Administration on Dec. 27, 2023, which corresponds to Chinese Patent Application No. 202180036976.2 and is related to U.S. Appl. No. 18/001,836; with English language translation.

Notification of Transmittal of Translation of the International Preliminary Report on Patentability and Translation of Written Opinion of the International Searching Authority; PCT/JP2021/006170; mailed on Jan. 5, 2023.

International Search Report issued in PCT/JP2021/006170; mailed May 11, 2021.

The extended European search report issued by the European Patent Office on Jun. 11, 2024, which corresponds to European Patent Application No. 21829333.0-1009 and is related to U.S. Appl. No. 18/001,836.

* cited by examiner (a)

(b)

TIRE

TECHNICAL FIELD

The present invention relates to a tire having a tread part provided with a main groove.

BACKGROUND ART

Patent documents 1 and 2 disclose a tire having a tread part provided with a main groove. One groove wall of the main groove is inclined to the groove outer side with respect to the normal line of a tread of the tread part when viewed from the tread side to the groove bottom side of the tread part. The main groove having such a groove wall becomes advantageous in maintaining drainability after wear of the tread part, and thereby improving wet performance.

PRIOR ART DOCUMENT

Patent Document

Patent Document 1: JP 2016-124442 A
Patent Document 2: JP 2019-026241 A

SUMMARY OF THE INVENTION

Problem to be Solved by the Invention

However, with the above-described tire, there is a room for improvement with respect to riding comfort performance after wear of the tread part.

An object of the invention is to provide a tire having little change in riding comfort performance and wet performance before and after wear of the tread part and in which riding comfort performance and wet performance as when the tire is newly used are maintained.

Means to Solve the Problem

As a result of intensive studies, the inventor has found that the previously-described problem could be solved by producing a tire comprising a tread being composed of a rubber layer in which there is little change in hardness after thermal deterioration and having a groove shape such that a sea ratio after wear with respect to a sea ratio as when the tire is newly used is within a predetermined range, and has completed the invention.

That is, the present invention relates to:

[1] A tire having a tread part, wherein the tread part is provided with at least one main groove extending continuously in the tire circumferential direction, wherein, when a sea ratio at a tread ground contact surface of the tire being newly used is defined as $S_0$ (%) and a sea ratio when the tread part is worn so that the depth of the main groove is 50% of that of the tire being newly used is defined as $S_{50}$ (%), $S_{50}/S_0$ is 1.05 to 1.40, and wherein, when a rubber hardness measured by pressing a type A durometer against a rubber piece from the ground contact surface side at 23° C. in accordance with JIS K 6253-3:2012, which the rubber piece is obtained by cutting out all the rubber forming the tread part in a tire radial direction from a land part closest to the equatorial plane of the tire being newly used, is defined as $Hs_0$ and a rubber hardness measured by pressing a type A durometer against a rubber piece from the ground contact surface side, which the rubber piece is obtained by subjecting the rubber piece of the new tire to heat aging in an atmosphere of 80° C. for 168 hours and allowing it to cool to 23° C., is defined as $Hs_{50}$, $Hs_{50}/Hs_0$ is 0.95 to 1.04,

[2] The tire of [1] above, wherein the tread part has at least a first rubber layer constituting a tread surface and a second rubber layer being arranged adjacent on the inner side of the first rubber layer in the radial direction,

[3] The tire of [2] above, wherein a difference ($AE_T$–$AE_B$) between an acetone extraction amount $AE_T$ of a rubber composition constituting the first rubber layer and an acetone extraction amount $AE_B$ of a rubber composition constituting the second rubber layer is –10 to 5% by mass,

[4] The tire according to [2] or [3] above, wherein a rubber composition constituting the first rubber layer comprises a liquid polymer,

[5] The tire of any one of [1] to [4] above, wherein at least one groove wall of the main groove is provided with a recessed part being recessed on the outer side of a groove edge appearing on a tread of the tread part in the groove width direction; and a total amount of recess of the main groove is 0.10 to 0.90 times the groove width being the length between groove edges of the main groove,

[6] The tire of any one of [1] to [5] above, wherein a first groove wall being one groove wall of the main groove is provided with at least one first recessed part being recessed on the outer side of a groove edge appearing on a tread of the tread part in the groove width direction; and the first recessed part has a deepest part being recessed most outwardly in the groove width direction in which an amount of recess from the groove edge gradually decreases toward both sides in the tire circumferential direction from the deepest part,

[7] The tire of [6] above, wherein the amount of recess of the deepest part is 0.10 to 0.50 times the groove width being the length between groove edges of the main groove,

[8] The tire of [6] or [7] above, wherein the first groove wall is provided with at least one second recessed part being recessed on the outer side of the groove edge in the groove width direction and having the amount of recess from the groove edge being constant in the tire circumferential direction,

[9] The tire of [8] above, wherein a maximum amount of recess of the second recessed part is less than the amount of recess of the deepest part of the first recessed part.

Effects of the Invention

According to the invention, a tire comprising a tread being composed of a rubber layer in which there is little change in hardness after thermal deterioration and having a groove shape such that a sea ratio after wear with respect to a sea ratio as when the tire is newly used is within a predetermined range is produced to provide a tire having little change in riding comfort performance and wet performance before and after the tread part is worn and in which riding comfort performance and wet performance as when the tire is newly used are maintained.

EMBODIMENT FOR CARRYING OUT THE INVENTION

Figure 1:
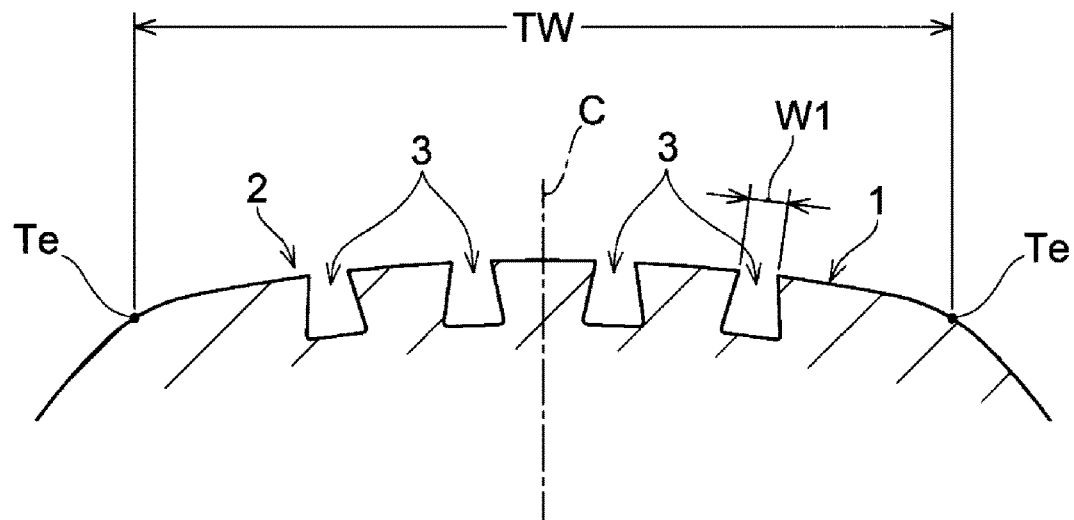
FIG. 1 is a lateral cross-sectional view of a tread part of a tire according to one embodiment of the present disclosure.

A tire being one embodiment of the present disclosure is a tire having a tread part, wherein the tread part is provided with at least one main groove extending continuously in the tire circumferential direction, wherein, when a sea ratio at a tread ground contact surface of the tire being newly used is defined as $S_0$ (%) and a sea ratio when the tread part is worn so that the depth of the main groove is 50% of that of the tire being newly used is defined as $S_{50}$ (%), $S_{50}/S_0$ is 1.05 to 1.40, preferably 1.07 to 1.37, more preferably 1.10 to 1.35, further preferably 1.15 to 1.33, and particularly preferably 1.18 to 1.31, and wherein, when a rubber hardness measured by pressing a type A durometer against a rubber piece from the ground contact surface side at 23° C. in accordance with JIS K 6253-32012, which the rubber piece is obtained by cutting out all the rubber forming the tread part in a tire radial direction from a land part closest to the equatorial plane of the tire being newly used, is defined as $Hs_0$ and a rubber hardness measured by pressing a type A durometer against a rubber piece from the ground contact surface side, which the rubber piece is obtained by subjecting the rubber piece of the new tire to heat aging in an atmosphere of 80° C. for 168 hours and allowing it to cool to 23° C., is defined as $Hs_{50}$, $Hs_{50}/Hs_0$ is 0.95 to 1.04, preferably 0.96 to 1.03, more preferably 0.97 to 1.03, and further preferably 0.97 to 1.02.

Note that "a sea ratio $S_0$" in the specification means the ratio (%) of the total of the groove area for all grooves that can remain when the main groove is worn to 50%, with respect to the total of the tread ground contact area with all grooves of a tread part 2 as when the tire is newly used being buried. In other words, the groove area for the groove that does not remain when the main groove is worn to 50% is not to be included in the total of the groove area. Moreover, "a sea ratio $S_{50}$" means the ratio (%), with respect to the total of the tread ground contact area with all grooves of the tread part 2 as when the main groove is worn to 50% being buried, of the total of the groove area for all grooves that remain then. Moreover, in a case that the tread part 2 is provided with a plurality of main grooves, the depths of which main grooves differ, "the main groove" being referred to here refers to the deepest thereof, while the state in which the main groove is worn to 50% is the state in which each of land parts within the ground contact surface is worn by a thickness corresponding to the main groove being brought to be 50%.

While the method of determining the sea ratio $S_0$ and the sea ratio $S_{50}$ is not particularly limited, they can be calculated by the following method, for example. The ground contact shape of a tire can be obtained by mounting the tire to a normal rim, then filling the tire with 230 kPa for a passenger car tire or with a normal internal pressure (a maximum internal pressure) for a light weight truck or a van truck, then applying ink to the tread part 2, vertically pressing the tread part 2 against paper, etc., with a load of 70% of the maximum load capability for the passenger car tire or with a load of 80% of the maximum load capability for the light weight truck or the van truck, and transferring thereto ink applied to the tread part 2. The sea ratio $S_0$ can be calculated by setting an area obtained by an outer ring of the ground contact shape obtained to be the total of the tread ground contact area with all grooves thereof being buried and determining the total of the groove area for all grooves that can remain when the main groove is worn to 50%, of the portion to which ink is not affixed. Moreover, with a technique similar to what is described above, the sea ratio $S_{50}$ can be calculated by determining the total of the tread ground contact area with all grooves of the tread part 2 as when the is main groove is worn to 50% being buried and the total of the groove area for all grooves that remain then.

Change in the sea ratio before and after the tread is worn and change in hardness of the rubber layer constituting the tread satisfying the above-described requirements makes it possible for an obtained tire to exhibit riding comfort performance and wet performance over a long period of time. Although it is not intended to be bound by theory with respect to the reason therefor, it can be considered as follows:

It is considered that change in the sea ratio before and after the tread is worn being set to be within the above-described range makes it possible to secure an opening area of the main groove of the tread of the tread part even when the tread part is worn, exhibiting excellent wet performance over a long period of time.

Moreover, it is considered that suppressing change in hardness due to heat dissipation of rubber of the tread part or change in hardness over time thereof makes it possible to suppress an increase in rigidity of the land part and suppress deterioration in riding comfort performance.

Furthermore, it is considered that, as the tread part being worn generally causes damping due to the thickness of the tread part to decrease, vibration due to road surface roughness tends to be transmitted to the vehicular body, so that riding comfort performance deteriorates, but, with the tire of the present disclosure, the area of the tread land part decreases due to traveling, so that the rigidity of the land part decreases, making it possible to more effectively suppress deterioration in riding comfort performance.

In the tire of the present disclosure, the tread part preferably has at least a first rubber layer constituting a tread surface and a second rubber layer being arranged adjacent on the inner side of the first rubber layer in the radial direction.

In the tire of the present disclosure, a difference ($AE_T - AE_B$) between an acetone extraction amount $AE_T$ of a rubber composition constituting the first rubber layer and an acetone extraction amount $AE_B$ of a rubber composition constituting the second rubber layer is preferably −10 to 5% by mass.

In the tire of the present disclosure, the rubber composition constituting the first rubber layer preferably comprises a liquid polymer.

In the tire of the present disclosure, the sea ratio $S_0$ at the tread ground contact surface as when the tire is newly used is preferably 10 to 40% and more preferably 20 to 35%.

In the tire of the present disclosure, preferably, at least one groove wall of the main groove is provided with a recessed part being recessed on the outer side of a groove edge appearing on a tread of the tread part in the groove width direction; and a total amount of recess of the main groove is 0.10 to 0.90 times the groove width being the length between groove edges of the main groove.

In the tire of the present disclosure, preferably, a first groove wall being one groove wall of the main groove is provided with at least one first recessed part being recessed on the outer side of a groove edge appearing on a tread of the tread part in the groove width direction, and the first recessed part has a deepest part being recessed most outwardly in the groove width direction in which an amount of recess from the groove edge gradually decreases toward both sides in the tire circumferential direction from the deepest part.

In the tire of the present disclosure, the first recessed part is preferably provided on the groove bottom side of the groove wall.

In the tire of the present disclosure, the first recessed part preferably has an arc-shaped contour portion in a cross section passing through the deepest part and being along the tread.

In the tire of the present disclosure, the first recessed part preferably has an amount of recess gradually decreasing outwardly in the tire radial direction from the deepest part in a groove lateral cross section passing through the deepest part.

In the tire of the present disclosure, the amount of recess of the deepest part is preferably 0.10 to 0.50 times the groove width being the length between groove edges of the main groove.

In the tire of the present disclosure, the first groove wall is preferably provided with at least one second recessed part being recessed on the outer side of the groove edge in the groove width direction and having the amount of recess from the groove edge being constant in the tire circumferential direction.

In the tire of the present disclosure, a maximum amount of recess of the second recessed part is preferably less than the amount of recess of the deepest part of the first recessed part.

In the tire of the present disclosure, preferably, the first groove wall is alternately provided with the first recessed part and the second recessed part in the tire circumferential direction.

In the tire of the present disclosure, a second groove wall being the other groove wall of the main groove is preferably provided with the at least one first recessed part.

In the tire of the present disclosure, preferably, each of the first groove wall and the second groove wall is provided with the first recessed part in a plurality, and the first recessed part, which the first groove wall is provided with, and the first recessed part, which the second groove wall is provided with, are alternately provided in the tire circumferential direction.

A procedure of producing the tire being one embodiment of the present disclosure will be described in detail below. Note the following description is exemplary for explaining the present disclosure and is not intended to limit the technical scope of the invention only to this description range. Besides, in the specification, a numerical range shown using the recitation "to" is to include the numerical values at both ends thereof.

[Tread Pattern]

While a tire according to one embodiment of the present disclosure is exemplified in FIG. 1, it is not to be limited thereto. FIG. 1 shows a lateral cross-sectional view of the tread part 2 of a tire 1 of the present disclosure. Note that FIG. 1 is a meridian section including a tire rotational axis of the tire 1 in a normal state. The tire 1 of the present disclosure is suitably used as a pneumatic tire for a passenger car, for example. Besides, it is not to be limited to such an aspect, so that the tire 1 of the present disclosure can be used for heavy load, for example.

In the present disclosure, unless otherwise specified, dimensions and angles of each member of the tire are measured with the tire being incorporated into the normal rim and filled with air so as to achieve the normal internal pressure. Note that, at the time of measurement, no load is applied to the tire.

The "normal rim" is a rim defined, in a standard system including a standard on which the tire is based, for each tire by the standard, and is a "standard rim" for JATMA, a "Design Rim" for TRA, and a "Measuring Rim" for ETRTO. Besides, in a case of a tire having a size not specified in the standard system, it is to refer to what can be rim-assembled to the tire and has the least width of minimum diameter rims, causing no air leakage between the rim and the tire.

The "normal internal pressure" is an air pressure defined for each tire by each standard, in a standard system including a standard on which the tire is based, and is "a maximum air pressure" for JATMA, a maximum value described in the table "TIRE LOAD LIMITS AT VARIOUS COLD INFLATION PRESSURES" for TRA, or "INFLATION PRESSURE" for ETRTO. Note that, in a case of a tire having a size not specified in the standard system, the normal internal pressure is to be 250 kPa.

"The normal state" is a state in which a tire is rim-assembled to a normal rim and filled with a normal internal pressure, and is, even more, a non-load state. Note that, in a case of a tire having a size not specified in the standard system, it is to refer to a state in which the tire is rim-assembled to the minimum rim and filled with 250 kPa, and is, even more, a non-load state.

The "normal load" is a load defined for each tire by each standard, in a standard system including a standard on which the tire is based, and is "a maximum load capability" for JATMA, a maximum value described in the table "TIRE LOAD LIMITS AT VARIOUS COLD INFLATION PRESSURES" for TRA, or "LOAD CAPACITY" for ETRTO. Note that, in a case of a tire having a size not specified in the standard system, a normal load $W_L$ (kg) can be estimated using the below-described Equations (4) and (5), where the tire cross-sectional width measured in the normal state is Wt (mm), the tire cross-sectional height is H1 (mm), and the tire outer diameter is Dt (mm):

$$V=\{(Dt/2)^2-(Dt/2-H1)^2\}\times\pi\times Wt \quad (4)$$

$$W_L=0.000011\times V+175 \quad (5)$$

As shown in FIG. 1, the tread part 2 is provided with at least one main groove 3 extending continuously in the tire circumferential direction. While main grooves 3 being mutually adjacent in the tire axial direction are provided between a tire equator C and each tread end Te in the present disclosure, so that a total of four of the main grooves 3 are provided, they are not limited to such an aspect. Note that the tread end Te is the maximum position of the tread ground contact surface in the tire axial direction when the sea ratio $S_0$ is determined.

The tread pattern of the tire of the present disclosure is not particularly limited as long as it has a groove shape in which change in the sea ratio ($S_0/S_{50}$) before and after the tread part 2 is worn is within the previously-described range.

A groove width W1 of each of the main grooves 3 is preferably 3.0 to 6.0% of a tread width TW, for example. Note that, in the specification, unless otherwise specified, the groove width of the main groove means the length between groove edges appearing on a tread of the tread part 2. The tread width TW is the distance in the tire axial direction from one tread end Te to the other tread end Te in the normal state. The groove depth of each of the main grooves 3 is preferably 5 to 10 mm, for example, for a pneumatic tire for a passenger car.

In the tire according to one embodiment of the present disclosure, at least one groove wall of the main groove 3 is provided with a recessed part being recessed on the outer side of a groove edge 6 appearing on the tread of the tread part 2 in the groove width direction.

Figure 2:
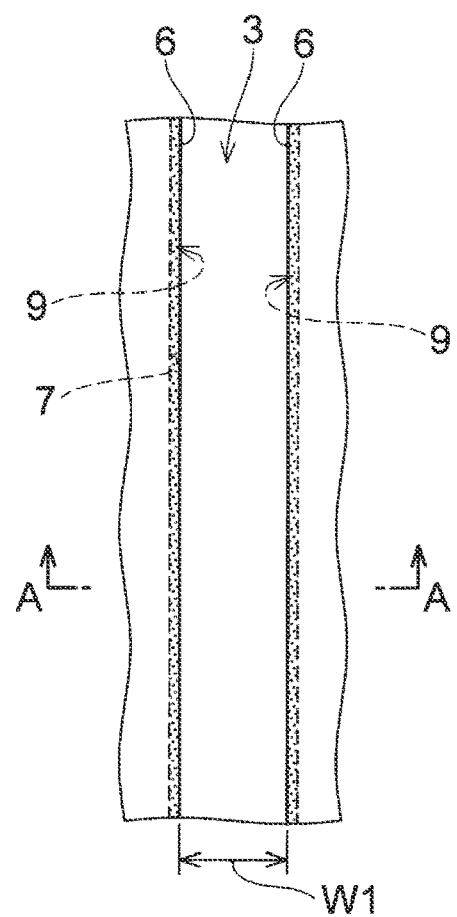
FIG. 2 is an enlarged plan view of a main groove according to one embodiment of the present disclosure.

FIG. 2 shows an enlarged plan view of the main groove 3 according to the present disclosure. In FIG. 2, the groove edge 6 of the main groove 3 is shown with a solid line, while a groove wall contour 7 in a plan view of the tread part 2 is shown with a broken line. Moreover, a region being recessed between the groove edge 6 of the main groove 3 and the groove wall contour 7 is shaded.

Figure 3:
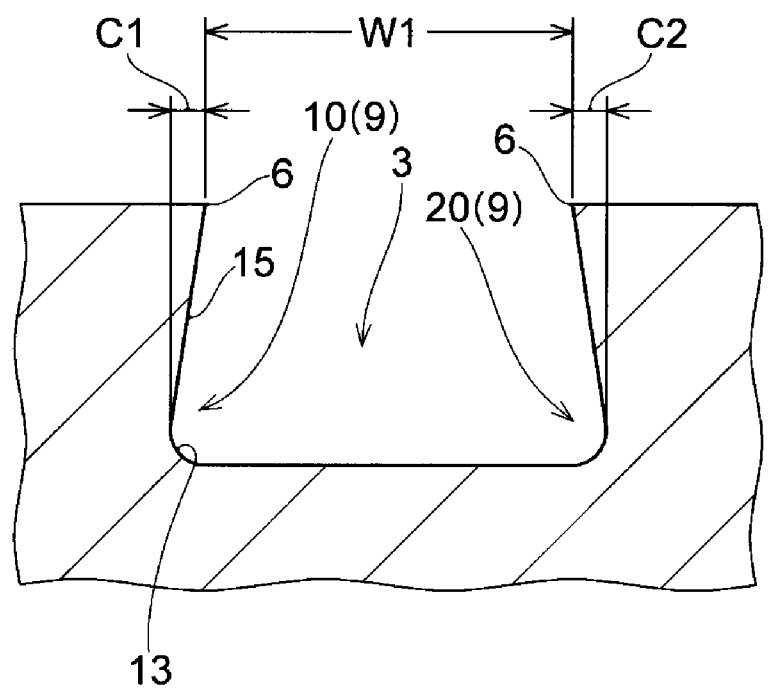
FIG. 3 is a cross-sectional view of FIG. 2, which cross-sectional view is taken along a line A-A.

FIG. 3 shows a cross-sectional view of the main groove 3 shown in FIG. 2, which cross-sectional view is taken along a line A-A. As shown in FIG. 3, the main groove 3 is provided with a recessed part 9 on the groove wall on both sides, which recessed part 9 has a constant amount of recess in the tire circumferential direction. While the recessed part 9 is provided with a flat surface 15 between a deepest part 13 and the groove edge 6, for example, it is not limited to such an aspect.

To secure the groove volume of the main groove 3, each of an amount of recess c1 and an amount of recess c2 of the deepest part 13 from the groove edge 6 independently is preferably 0.05 to 0.45 times, more preferably 0.07 to 0.40 times, and further preferably 0.10 to 0.35 times the groove width W1 being the length between groove edges of the main groove 3.

Figure 4:
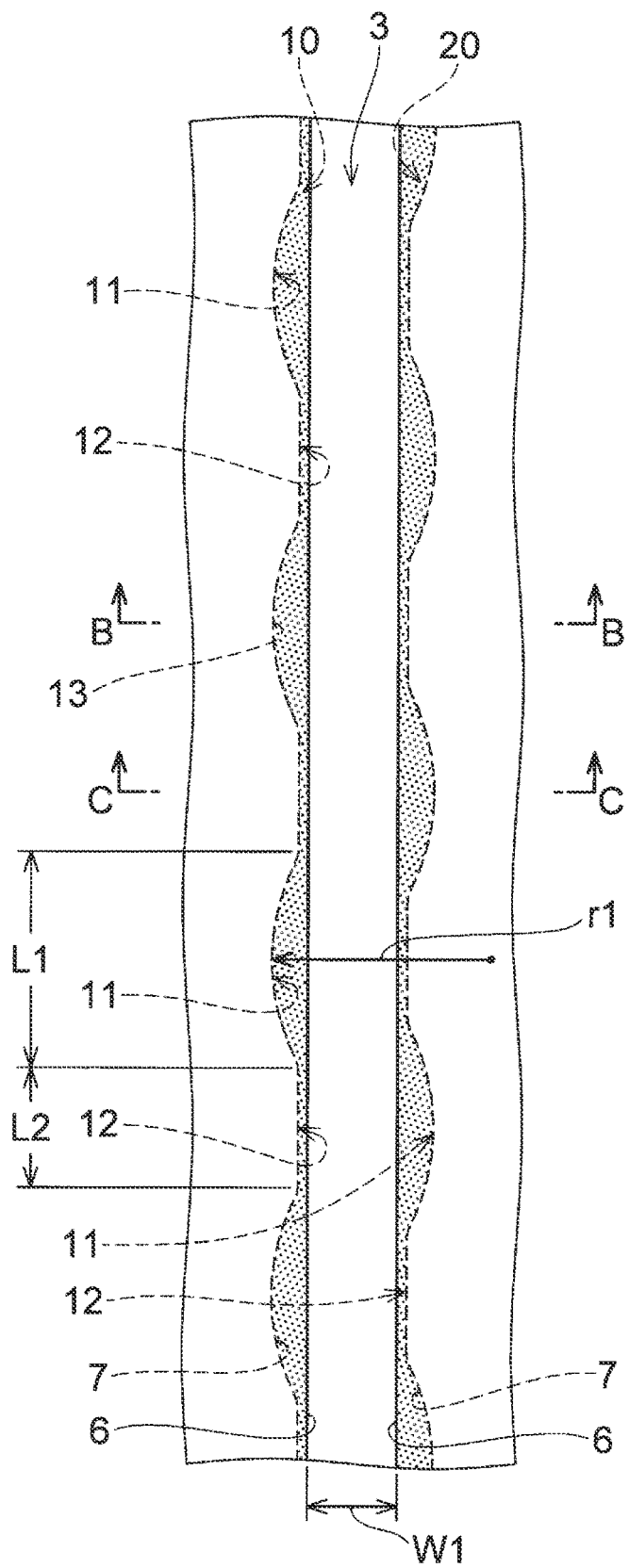
FIG. 4 is an enlarged plan view of another main groove according to the present disclosure.

FIG. 4 shows an enlarged plan view of another main groove 3 according to the present disclosure. As shown in FIG. 4, a first groove wall 10 being one groove wall of the main groove 3 is provided with at least one first recessed part 11. The first groove wall 10 of the present disclosure is provided with the first recessed part 11 in a plurality.

In FIG. 4, the groove edge 6 of the main groove 3 is shown with a solid line, while the groove wall contour 7 in a plan view of the tread part 2 is shown with a broken line. Moreover, a region being recessed between the groove edge 6 of the main groove 3 and the groove wall contour 7 is shaded. The first recessed part 11 is recessed on the outer side of the groove edge 6 appearing on the tread of the tread part 2 in the groove width direction. The first recessed part 11 has an opening area of the main groove 3 increasing as the tread part 2 is worn, exhibiting excellent wet performance over a long period of time.

The first recessed part 11 has a deepest part 13 being recessed most outwardly in the groove width direction in which an amount of recess from the groove edge 6 gradually decreases toward both sides in the tire circumferential direction from the deepest part. In this way, the rigidity of the land part partitioned by the main groove 3 is secured on both sides of the deepest part 13 in the tire circumferential direction, making it possible to suppress collapsing of a land part groove edge side portion 8 (shown in FIG. 1) toward the groove center side of the main groove 3. Moreover, the first recessed part 11 smoothly changes the rigidity of the land part in the tire circumferential direction, suppressing local deformation of the groove edge side portion 8. Therefore, excellent steering stability performance is obtained.

While the main groove extending continuously in the tire circumferential direction generally discharges water to the rear in the tire running direction when running on a wet road surface, in a case that the amount of water on the road surface is large, it tends to push away some of the water to the front in the tire running direction. With the main groove 3 of the present disclosure, the above-described first recessed part 11 can push away some of the water to the front in the tire running direction and outwardly in the tire axial direction, and, consequently, suppresses the pushed away water getting in between the tread part 2 and the road surface. Moreover, the groove area increases as wear progresses, so that a decrease in the groove volume in conjunction with the progress of wear can be delayed in comparison with the conventional groove.

With respect to the arc-shaped contour portion 7 in a cross section along the tread of the tread part 2, the first recessed part 11 preferably has the curvature thereof gradually increasing inwardly in the tire radial direction. The first recessed part 11 as such can secure a large groove volume of the main groove 3 while suppressing deformation of the groove edge side portion 8.

In the present disclosure, a radius of curvature r1 of the contour portion 7 is preferably 1.5 to 3.0 times the groove width W1. Moreover, a length L1 in the tire circumferential direction of the first recessed part 11 is preferably 2.0 to 3.0 times the groove width W1 of the main groove 3.

FIG. 5(a) is a cross-sectional view of FIG. 4, which cross-sectional view is taken along a line B-B, corresponding to a groove lateral cross-sectional view passing through the deepest part 13 of the first recessed part 11, which the first groove wall 10 is provided with. As shown in FIG. 5(a), the first recessed part 11 is preferably provided on the groove bottom side of the groove wall of the main groove 3.

The first recessed part 11 of the present disclosure includes a concave surface part 17 being recessed outwardly in the groove width direction and a convex surface part 18 being connected to the concave surface part 17 on the outer side thereof in the tire radial direction and to be convex toward the groove center line side of the main groove 3, for example. Each of the concave surface part 17 and the convex surface part 18 is preferably curved in a smooth arc shape. Besides, the first recessed part 11 is not to be limited to such an aspect, so that it can be provided with a flat surface between the deepest part 13 and the groove edge 6, for example.

The first recessed part 11 preferably has an amount of recess gradually decreasing outwardly in the tire radial direction from the deepest part 13 in a groove lateral cross section passing through the deepest part 13. To secure the groove volume of the main groove 3, an amount of recess d1 of the deepest part 13 from the groove edge 6 is preferably 0.10 or more times, more preferably 0.20 or more times, and further preferably 0.30 or more times the groove width W1 being the length between groove edges of the main groove 3. Moreover, while the amount of recess d1 is not particularly limited, it is preferably 0.50 or less times the groove width W1 from the viewpoint of making it easy to take out, from the tread part, ribs for forming the main groove of a vulcanization mold.

As shown in FIG. 4, preferably, the first groove wall 10 is further provided with at least one second recessed part 12. In a preferred aspect, the first groove wall 10 is provided with the second recessed part 12 in a plurality. As a further preferred aspect, the first groove wall 10 of the present disclosure is alternately provided with the first recessed part 11 and the second recessed part 12 in the tire circumferential direction. The second recessed part 12 is recessed on the outer side of the groove edge 6 in the groove width direction and has an amount of recess from the groove edge 6 being constant in the tire circumferential direction.

The second recessed part 12 preferably has a length in the tire circumferential direction being less than that of the first recessed part 11, for example. A length L2 of the second recessed part 12 in the tire circumferential direction is preferably 0.45 to 0.60 times the length L1 of the first recessed part 11 in the tire circumferential direction, for example. The second recessed part 12 as such can increase steering stability performance and wet performance in a well-balanced manner.

Figure 5:
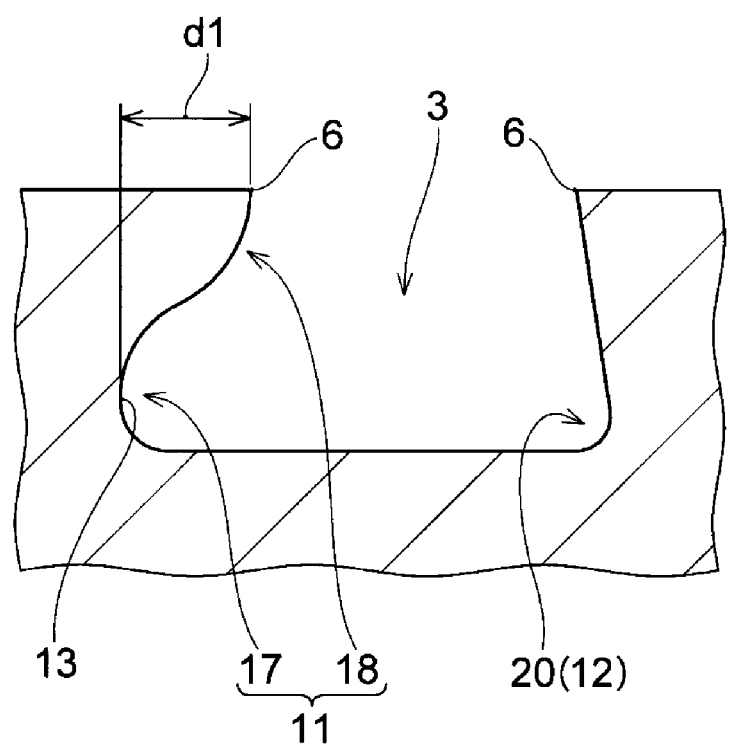
FIG. 5(a) is a cross-sectional view of FIG. 4, which cross-sectional view is taken along a line B-B.
FIG. 5(b) is a cross-sectional view of FIG. 4, which cross-sectional view is taken along a line C-C.
Figure 5:
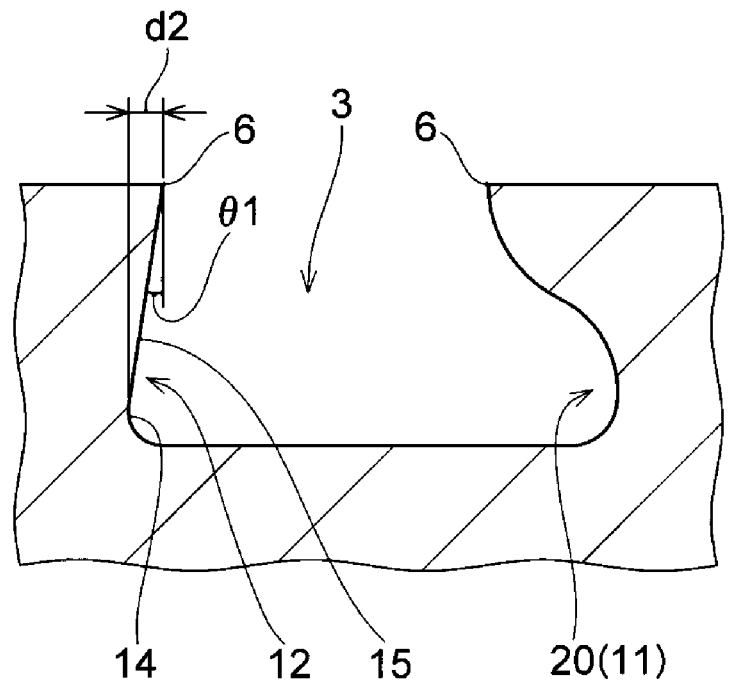

FIG. 5(*b*) is a cross-sectional view of FIG. 2, which cross-sectional view is taken along a line C-C, corresponding to a groove lateral cross-sectional view passing through the second recessed part 12, which the first groove wall 10 is provided with. As shown in FIG. 5(*b*), while the second recessed part 12 is provided with the flat surface 15 between a deepest part 14 and the groove edge 6, for example, it is not limited to such an aspect.

An angle θ1 of the flat surface 15 of the second recessed part 12 is preferably 5 to 15°, for example. Note that the angle θ1 is an angle between the tread normal line passing through the groove edge 6, and the flat surface 15. The recessed part 12 as such can improve wet performance after the tread part is worn.

From the similar viewpoint, a maximum amount of recess d2 of the second recessed part 12 is preferably less than the amount of recess d1 of the deepest part 13 of the first recessed part 11. Moreover, the maximum amount of recess d2 of the second recessed part 12 is preferably 0.01 to 0.25 times, more preferably 0.03 to 0.20 times, and further preferably 0.05 to 0.15 times the groove width W1 of the main groove 3.

As shown in FIG. 4, a second groove wall 20 being the other groove wall of the main groove 3 is provided with the above-described at least one first recessed part 11. Moreover, the second groove wall 20 is provided with the above-described at least one second recessed part 12. Note that FIG. 5(*a*) shows a groove lateral cross-sectional view of the second recessed part 12, which the second groove wall 20 is provided with, while FIG. 5(*b*) shows a groove lateral cross-sectional view of the first recessed part 11, which the second groove wall 20 is provided with.

As shown in FIG. 4, in a preferred embodiment, the second groove wall 20 is provided with each of the first recessed part 11 and the second recessed part 12 in a plurality. As a further preferred embodiment, the second groove wall 20 of the present disclosure is alternately provided with the first recessed part 11 and the second recessed part 12 in the tire circumferential direction. In this way, steering stability performance and wet performance after the tread part is worn is improved in a well-balanced manner.

In the present disclosure, the first recessed part 11, which the second groove wall 20 is provided with, faces the second recessed part 12, which the first groove wall 10 is provided with, for example. The second recessed part 12, which the second groove wall 20 is provided with, faces the first recessed part 11, which the first groove wall 10 is provided with, for example. In this way, the first recessed part 11, which the first groove wall 10 is provided with, and the first recessed part 11, which the second groove wall 20 is provided with, are alternately provided in the tire circumferential direction, for example. Such an arrangement of the recessed parts makes it possible to suppress an increase in the air column resonance tone of the main groove.

Figure 6:
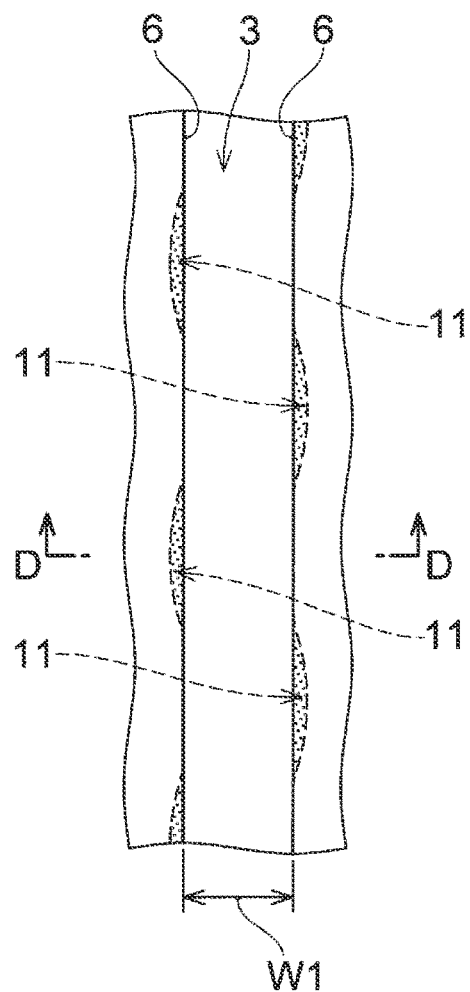
FIG. 6 is an enlarged plan view of another main groove according to the present disclosure.
Figure 7:
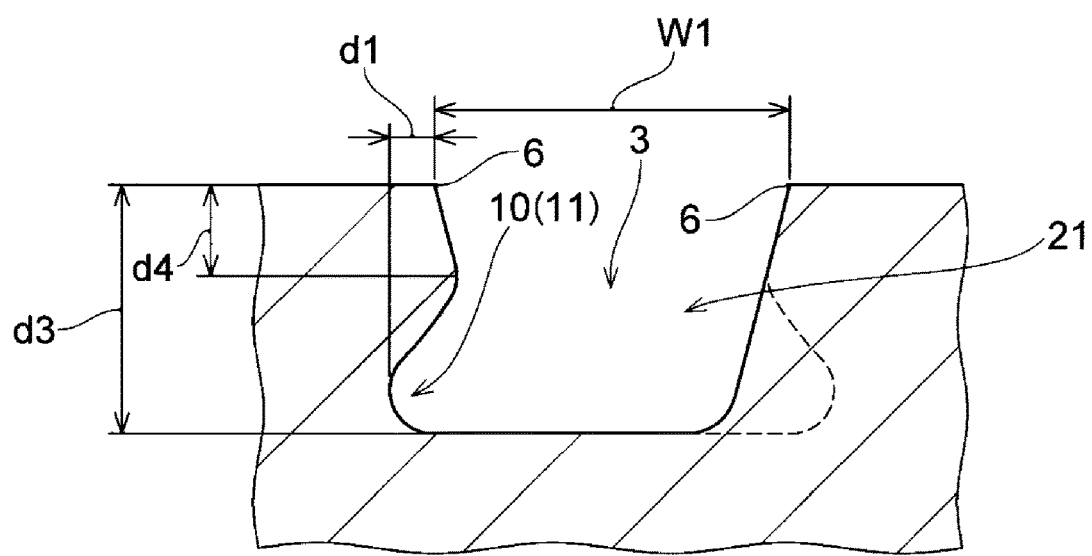
FIG. 7 is a cross-sectional view of FIG. 6, which cross-sectional view is taken along a line D-D.

FIG. 6 shows an enlarged plan view of another main groove 3 according to the present disclosure. FIG. 7 shows a cross-sectional view of the main groove 3 shown in FIG. 6, which cross-sectional view is taken along a line D-D. As shown in FIGS. 6 and 7, the main groove 3 has a groove width gradually decreasing part 21 in which the groove width gradually decreases inwardly in the tire radial direction from the groove edge 6, for example. Moreover, the first recessed part 11 is arranged on the inner side of the groove width gradually decreasing part 21 in the tire radial direction. The main groove 3 as such can further suppress deforming of the land part groove edge side portion 8 as when the tire is newly used, making it possible to obtain excellent steering stability.

The groove width gradually decreasing part 21 extends in the tire circumferential direction with a constant cross-sectional shape, for example. A depth d4 of the groove width gradually decreasing part 21 is preferably 0.30 to 0.50 times a depth d3 of the main groove 3, for example.

The first recessed part 11 is provided in a plurality in the tire circumferential direction on the inner side of the groove width gradually decreasing part 21 in the tire radial direction, for example. In this embodiment, the first recessed part 11, which the first groove wall 10 is provided with, and the first recessed part 11, which the second groove wall 20 is provided with, are alternately provided in the tire circumferential direction on the inner side of the groove width gradually decreasing part 21 in the tire radial direction. The main groove 3 as such can exhibit wet performance over a long period of time while suppressing local deformation of the land part and securing excellent steering stability.

To secure the groove volume of the main groove 3, the total amount of recess of the main groove 3 is preferably 0.10 to 0.90 times, more preferably 0.15 to 0.80 times, and further preferably 0.20 to 0.70 times the groove width W1 of the main groove 3. Note that, in the specification, "the total amount of recess of the main groove" refers to c1+c2 for the main groove 3 being the aspect in FIG. 3, to d1+d2 for the main groove 3 being the aspect in FIG. 5, and to d1 for the main groove 3 being the aspect in FIG. 7.

Figure 8:
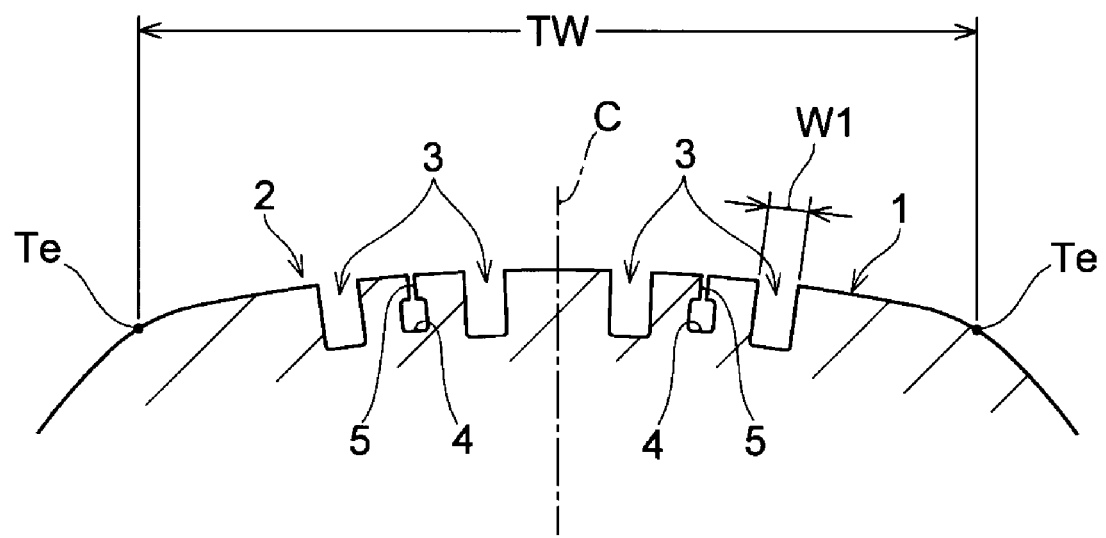
FIG. 8 is a lateral cross-sectional view of the tread part of the tire according to another embodiment of the present disclosure.

FIG. 8 shows a lateral cross-sectional view of the tread part 2 of the tire according to another embodiment of the present disclosure. As shown in FIG. 8, a sunken groove 4 is provided between the main grooves 3, which sunken groove 4 appears when the tread part 2 is worn. Even such an aspect makes it possible to increase the sea ratio $S_{50}/S_0$ after the tread part 2 is worn. The sunken groove 4 is preferably continuous in the tire circumferential direction.

While the sunken groove 4 communicates with the tread surface through a sipe 5 in FIG. 8, the groove width of which sipe 5 is less than 2 mm, it is not limited to such an aspect, so that it can communicate therewith in a zig-zag or curved manner. Moreover, for the sunken groove 4, without providing a coupling part with the tread surface, a tube-like rubber can be buried such that a gap is produced in advance inwardly in the tire radial direction.

While the groove width W1 of the main groove 3 is constant in the tire radial direction in FIG. 8, it is not limited to such an aspect. For example, as shown in FIGS. 2 to 7, the groove wall of the main groove 3 can be provided with a recessed part being recessed on the outer side of the groove edge 6 appearing on the tread of the tread part 2 in the groove width direction.

A tread of the present disclosure preferably has at least a first rubber layer constituting a tread surface and a second rubber layer being arranged adjacent on the inner side of the first rubber layer in the radial direction thereof. The first rubber layer typically corresponds to a cap tread.

The second rubber layer typically corresponds to a base tread or an under tread. Moreover, as long as the object of the present disclosure is realized, it can further have one or a plurality of rubber layers between the second rubber layer and a belt outer layer.

[First Rubber Layer]

The rubber composition constituting the first rubber layer will be described below.

<Rubber Component>

The rubber composition constituting the first rubber layer preferably comprises at least one selected from the group consisting of an isoprene-based rubber, a styrene-butadiene rubber (SBR), and a butadiene rubber (BR) as rubber components. The rubber component may be a rubber component comprising a SBR and a BR, or may be a rubber component comprising an isoprene-based rubber, a SBR, and a BR. Moreover, the rubber component may be a rubber component consisting only of a SBR and a BR, or may be a rubber component consisting only of an isoprene-based rubber, a SBR, and a BR.

(Isoprene-Based Rubber)

As the isoprene-based rubber, those common in the tire industry such as an isoprene rubber (IR), a natural rubber and the like can be used, for example. In the natural rubber, in addition to a non-modified natural rubber (NR), an epoxidized natural rubber (ENR), a hydrogenated natural rubber (HNR), a deproteinized natural rubber (DPNR), an ultra pure natural rubber, a modified natural rubber including a grafted natural rubber, etc., and the like are also included. These isoprene-based rubbers may be used alone or two or more thereof may be used in combination.

The NR is not particularly limited, and, as the NR, those common in the tire industry such as, for example, SIR20, RSS #3, TSR20, and the like can be used.

When the rubber composition comprises the isoprene-based rubber (preferably the natural rubber and more preferably the non-modified natural rubber (NR)), a content of the isoprene-based rubber in 100% by mass of the rubber component is, from the viewpoint of wet performance, preferably 50% by mass or less, more preferably 40% by mass or less, further preferably 30% by mass or less, and particularly preferably 20% by mass or less. Moreover, while a lower limit of a content of the isoprene-based rubber when the rubber composition comprises the isoprene-based rubber is not particularly limited, it may be 1% by mass or more, 3% by mass or more, 5% by mass or more, 10% by mass or more, or 15% by mass or more, for example.

(SBR)

The SBR is not particularly limited, and examples thereof include a solution-polymerized SBR (S-SBR), an emulsion-polymerized SBR (E-SBR), modified SBRs thereof (a modified S-SBR, a modified E-SBR), and the like. Examples of the modified SBR include an SBR modified at its terminal and/or main chain, a modified SBR coupled with tin, a silicon compound, etc. (a modified SBR of condensate or having a branched structure, etc.), and the like. Furthermore, hydrogenated additives of these SBRs (hydrogenated SBRs) and the like may also be used. Among them, an S-SBR is preferable, and a modified S-SBR is more preferable.

Examples of the modified SBR include a modified SBR into which a functional group commonly used in this field is introduced. Examples of the above-described functional group include, for example, an amino group (preferably an amino group in which a hydrogen atom of the amino group is substituted with a $C_{1-6}$ alkyl group), an amide group, a silyl group, an alkoxysilyl group (preferably a $C_{1-6}$ alkoxysilyl group), an isocyanate group, an imino group, an imidazole group, an urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group (preferably a $C_{1-6}$ alkoxy group), a hydroxyl group, an oxy group, an epoxy group, and the like. Besides, these functional groups may have a substituent. Examples of the substituent include, for example, a functional group such as an amino group, an amide group, an alkoxysilyl group, a carboxyl group, and a hydroxyl group. Moreover, examples of the modified SBR may include a hydrogenated SBR, an epoxidized SBR, a tin-modified SBR, and the like.

As the SBR, an oil-extended SBR can be used, or a non-oil-extended SBR can be used. When the on-extended SBR is used, an on-extended amount of SBR, that is, a content of an oil-extended oil comprised in the SBR, is preferably 10 to 50 parts by mass based on 100 parts by mass of a rubber solid content of the SBR.

The SBRs listed above may be used alone or two or more thereof may be used in combination. As the SBRs listed above, for example, those commercially available from Sumitomo Chemical Co., Ltd., JSR Corporation, Asahi Kasei Corporation, Zeon Corporation, ZS Elastomer Co., Ltd., etc. can be used.

A styrene content of the SBR is preferably 15% by mass or more, more preferably 20% by mass or more, and further preferably 25% by mass or more, from the viewpoints of securing damping in the tread part and wet grip performance. Moreover, it is preferably 60% by mass or less, more preferably 50% by mass or less, and further preferably 45% by mass or less, from the viewpoints of temperature dependence of grip performance, and abrasion resistance. Besides, in the specification, the styrene content of the SBR is calculated by $^1$H-NMR measurement.

A vinyl content of the SBR is preferably 10 mol % or more, more preferably 13 mol % or more, and further preferably 16 mol % or more, from the viewpoints of ensuring reactivity with silica, rubber strength, and abrasion resistance. Moreover, the vinyl content of the SBR is preferably 70 mol % or less, more preferably 65 mol % or less, and further preferably 60 mol % or less, from the viewpoints of preventing temperature dependence from increasing, wet grip performance, elongation at break, and abrasion resistance. Besides, in the specification, the vinyl content (1,2-bond butadiene unit amount) of the SBR is measured by infrared absorption spectrometry.

A weight-average molecular weight (Mw) of the SBR is preferably 150,000 or more, more preferably 200,000 or more, and further preferably 250,000 or more, from the viewpoint of abrasion resistance. Moreover, the Mw is preferably 2,500,000 or less, more preferably 2,000,000 or less, and further preferably 1,500,000 or less, from the viewpoints of cross-linking uniformity and the like. Besides, the Mw of the SBR can be determined in terms of a standard polystyrene based on measurement values obtained by a gel permeation chromatography (GPC) (for example, GPC-8000 Series, manufactured by Tosoh Corporation, Detector: differential refractometer, Column: TSKGEL SUPERMULTIPORE HZ-M, manufactured by Tosoh Corporation).

A content of the SBR in 100% by mass of the rubber component when the rubber composition comprises the SBR is preferably 30% by mass or more, more preferably 40% by mass or more, further preferably 45% by mass or more, and particularly preferably 50% by mass or more, from the viewpoint of wet performance. Moreover, an upper limit of a content of the SBR in the rubber component is not particularly limited and may be 100% by mass.
(BR)

The BR is not particularly limited, and those commonly used in the tire industry can be used, such as, for example, a BR having a cis content of less than 50% by mass (a low cis BR), a BR having a cis content of 90% or more by mass (a high cis BR), a rare earth-based butadiene rubber synthesized using a rare earth element-based catalyst (a rare earth-based BR), a BR containing a syndiotactic polybutadiene crystal (an SPB-containing BR), a modified BR (a high cis modified BR, a low cis modified BR), and the like. Examples of the modified BR include a BR modified with a functional group or the like similar to that described in the SBRs above. These BRs may be used alone or two or more thereof may be used in combination.

As the high cis BR, those commercially available from Zeon Corporation, Ube Industries, Ltd., ISR Corporation, etc. can be used, for example. When a high cis BR is comprised, low temperature characteristics and abrasion resistance can be improved. The cis content is preferably 95% by mass or more, more preferably 96% by mass or more, further preferably 97% by mass or more, and particularly preferably 98% by mass or more. Besides, in the specification, the cis content (cis-1,4-bond butadiene unit amount) is a value calculated by infrared absorption spectrometry.

As the rare earth-based BR, those synthesized using a rare earth element-based catalyst and having a vinyl content of preferably 1.8 mol % or less, more preferably 1.0 mol % or less, and further preferably 0.8 mol % or less, and a cis content of preferably 95 mol % or more, more preferably 96 mol % or more, further preferably 97 mol % or more, and particularly preferably 98 mol % or more can be used. As the rare earth-based BR, those commercially available from LANXESS, etc. can be used, for example.

Examples of the SPB-containing BR include those in which a 1,2-syndiotactic polybutadiene crystal is chemically bonded with the BR and dispersed, but not those in which the crystal is simply dispersed in the BR. As such an SPB-comprising BR, those commercially available from Ube Industries, Ltd., etc. can be used.

As the modified BR, a modified butadiene rubber (modified BR) modified with a functional group comprising at least one element selected from the group consisting of silicon, nitrogen, and oxygen at its terminal and/or main chain is suitably used.

Examples of other modified BRs include those obtained by polymerizing 1,3-butadiene with a lithium initiator and then adding a tin compound and in which a modified BR molecule is bonded by a tin-carbon bond at its terminal (a tin-modified BR), and the like. Moreover, the modified BR may be hydrogenated or may not be hydrogenated.

The BRs listed above may be used alone or two or more thereof may be used in combination.

The glass transition temperature (Tg) of the BR is preferably −14 C or lower, more preferably −17 C or lower, and further preferably −20 C or lower from the viewpoint of preventing low temperature fragility. On the other hand, while a lower limit of the above-mentioned Tg is not particularly limited, from the viewpoint of abrasion resistance, it is preferably −150 C or higher, more preferably −120 C or higher, and further preferably −110 C or higher. Besides, the glass transition temperature of the BR is a value measured under the condition of a temperature increase rate of 10° C./min using differential scanning calorimetry (DSC) in accordance with Japanese Industrial Standard JIS K 7121.

A weight-average molecular weight (Mw) of the BR is preferably 300,000 or more, more preferably 350,000 or more, and further preferably 400,000 or more, from the viewpoint of abrasion resistance. Moreover, it is preferably 2,000,000 or less and more preferably 1,000,000 or less, from the viewpoints of cross-linking uniformity and the like. Besides, the Mw can be determined in terms of a standard polystyrene based on measurement values obtained by a gel permeation chromatography (GPC) (for example, GPC-8000 Series, manufactured by Tosoh Corporation, Detector: differential refractometer, Column: TSKGEL SUPERMULTIPORE HZ-M, manufactured by Tosoh Corporation).

A content of the BR in 100% by mass of the rubber component when the rubber composition comprises the BR is preferably 50% by mass or less, more preferably 45% by mass or less, further preferably 40% by mass or less, and particularly preferably 35% by mass or less, from the viewpoint of wet performance. Moreover, while a lower limit of a content of the BR when the rubber composition comprises the BR is not particularly limited, it may be 1% by mass or more, 3% by mass or more, 5% by mass or more, 10% by mass or more, or 15% by mass or more, for example.
(Other Rubber Components)

As the rubber component according to the present disclosure, rubber components other than the above-described isoprene-based rubbers, SBRs, and BRs may be contained. As other rubber components, a cross-linkable rubber component commonly used in the tire industry can be used, such as, for example, a styrene-isoprene-butadiene copolymer rubber (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (UR), an ethylene propylene rubber, a polynorbornene rubber, a silicone rubber, a polyethylene chloride rubber, a fluororubber (FKM), an acrylic rubber (ACM), a hydrin rubber, and the like. These other rubber components may be used alone or two or more thereof may be used in combination.
<Filler>

The rubber composition constituting the first rubber layer preferably comprises, as a filler, carbon black and/or silica. Moreover, the filler may be a filler consisting only of carbon black and silica.
(Carbon Black)

As carbon black, those common in the tire industry can be appropriately used. Examples thereof include GPF, FEF, HAF, ISAF, SAF, and the like, for example. These carbon blacks may be used alone or two or more thereof may be used in combination.

A nitrogen adsorption specific surface area ($N_2SA$) of carbon black is preferably 50 $m^2/g$ or more, and more preferably 70 $m^2/g$ or more, from the viewpoint of elongation at break. Moreover, from the viewpoints of fuel efficiency and processability, it is preferably 200 $m^2/g$ or less and more preferably 150 $m^2/g$ or less. Besides, the $N_2SA$ of carbon black is a value measured according to Japanese Industrial Standard JIS K 6217-2 "Carbon black for rubber—Fundamental characteristics—Part 2: Determination of specific surface area—Nitrogen adsorption methods—Single-point procedures".

The dibutyl phthalate (DBP) oil absorption amount of carbon black is preferably 30 ml/100 g or more and more preferably 50 ml/100 g or more from the viewpoint of reinforcing property. Moreover, from the viewpoints of fuel efficiency and processability, it is preferably 400 ml/100 g or less and more preferably 350 ml/100 g or less. Besides, the DBP oil absorption amount of carbon black is measured according to Japanese Industrial Standard JIS K 6221.

When the rubber composition comprises the carbon black, the content thereof based on 100 parts by mass of the rubber component is, from the viewpoints of weather resistance and reinforcing property, preferably 1 part by mass or more, more preferably 3 parts by mass or more, and further preferably 5 parts by mass or more. Moreover, from the viewpoints of fuel efficiency and abrasion resistance, it is preferably 50 parts by mass or less, more preferably 40 parts by mass or less, further preferably 30 parts by mass or less, and particularly preferably 20 parts by mass or less.

(Silica)

Silica is not particularly limited, and for example, those common in the tire industry can be used, such as silica prepared by a dry process (anhydrous silica), silica prepared by a wet process (hydrous silica), and the like, for example. Among them, hydrous silica prepared by a wet process is preferable because it has many silanol groups. These silicas may be used alone or two or more thereof may be used in combination.

A nitrogen adsorption specific surface area ($N_2SA$) of silica is preferably 140 m$^2$/g or more, more preferably 170 m$^2$/g or more, and further preferably 200 m$^2$/g or more, from the viewpoints of fuel efficiency and abrasion resistance. Moreover, it is preferably 350 m$^2$/g or less, more preferably 300 m$^2$/g or less, and further preferably 250 m$^2$/g or less, from the viewpoints of fuel efficiency and processability. Besides, the $N_2SA$ of silica in the specification is a value measured by the BET method according to ASTM D3037-93.

The average primary particle size of silica is preferably 20 nm or less, and more preferably 18 nm or less. The lower limit of the average primary particle size is not particularly limited and is preferably 1 nm or more, more preferably 3 nm or more, and further preferably 5 nm or more. When the average primary particle size of silica is in the above-described ranges, the dispersibility of silica can be improved more, and the reinforcing property, fracture properties, and abrasion resistance can be further improved. Besides, the average primary particle size of silica can be determined by observing it with a transmission or scanning electron microscope, measuring 400 or more primary particles of silica observed in the field of view, and averaging them.

A content of silica in the rubber composition based on 100 parts by mass of the rubber component when the rubber composition comprises silica is preferably 30 parts by mass or more, more preferably 40 parts by mass or more, and further preferably 50 parts by mass or more, from the viewpoint of wet performance. Moreover, it is preferably 130 parts by mass or less, more preferably 110 parts by mass or less, and further preferably 95 parts by mass or less, from the viewpoint of abrasion resistance.

(Other Fillers)

As fillers other than carbon black and silica, other fillers can further be used. While such fillers are not particularly limited, any one of fillers commonly used in this field, such as aluminum hydroxide, alumina (aluminum oxide), calcium carbonate, magnesium sulfate, talc, clay, and the like, for example, can be used. These fillers may be used alone or two or more thereof may be used in combination.

From the viewpoint of wet performance, a total content of the filler based on 100 parts by mass of the rubber component is preferably 40 parts by mass or more, more preferably 50 parts by mass or more, and further preferably 60 parts by mass or more. Moreover, from the viewpoints of fuel efficiency and elongation at break, it is preferably 150 parts by mass or less, more preferably 130 parts by mass or less, and further preferably 110 parts by mass or less.

A content of the silica in 100% by mass of the silica and carbon black is preferably 50% by mass or more, more preferably 60% by mass or more, further preferably 70% by mass or more, and particularly preferably 80% by mass or more. Moreover, a content of the silica is preferably 99% by mass or less, more preferably 97% by mass or less, and further preferably 95% by mass or less.

(Silane Coupling Agent)

Silica is preferably used in combination with a silane coupling agent. The silane coupling agent is not particularly limited, and any silane coupling agent conventionally used in combination with silica in the tire industry can be used, and examples thereof include, for example, a mercapto-based silane coupling agent as follows; a sulfide-based silane coupling agent such as bis(3-triethoxysilylpropyl) disulfide and bis(3-triethoxysilylpropyl)tetrasulfide; a thio-ester-based silane coupling agent such as 3-octanoylthio-1-propyltriethoxysilane, 3-hexanoylthio-1-propyltriethoxysilane, and 3-octanoylthio-1-propyltrimethoxysilane; a vinyl-based silane coupling agent such as vinyltriethoxysilane and vinyltrimethoxysilane; an amino-based silane coupling agent such as 3-aminopropyl-triethoxysilane, 3-aminopropyltrimethoxysilane, and 3-(2-aminoethyl) aminopropyltriethoxysilane; a glycidoxy-based silane coupling agent such as γ-glycidoxypropyltriethoxysilane and γ-glycidoxypropyltrimethoxysilane; a nitro-based silane coupling agent such as 3-nitropropyltrimethoxysilane and 3-nitropropyltriethoxysilane; a chloro-based silane coupling agent such as 3-chloropropyltrimethoxysilane and 3-chloropropyltriethoxysilane, and the like. Among them, the silane coupling agent containing a sulfide-based silane coupling agent and/or a mercapto-based silane coupling agent is preferable. These silane coupling agents may be used alone or two or more thereof may be used in combination.

The mercapto-based silane coupling agent is preferably a compound represented by the following Formula (1) and/or a compound comprising a bond unit A represented by the following Formula (2) and a bond unit B represented by the following Formula (3):

[Chemical Formula 1]

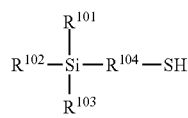

(1)

(Wherein, each of $R^{101}$, $R^{102}$, and $R^{103}$ independently represents a group represented by a $C_{1-12}$ alkyl, a $C_{1-12}$ alkoxy, or a —O—$(R^{11}$—O$)_z$—$R^{112}$ (Each of z $R^{111}$s independently represents a divalent hydrocarbon group having 1 to 30 carbon atoms; $R^{112}$ represents a $C_{1-30}$ alkyl, a $C_{2-30}$ alkenyl, a $C_{6-30}$ aryl, or a $C_{7-30}$ aralkyl; z represents an integer of 1 to 30); and $R^{104}$ represents a $C_{1-6}$ alkylene.)

[Chemical Formula 2]

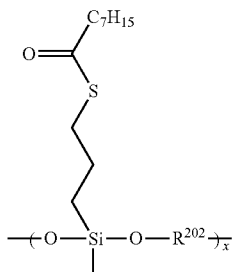

(2)

[Chemical Formula 2]

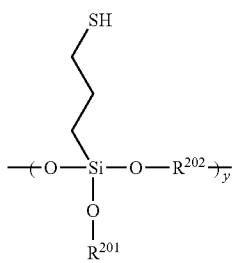

(3)

(Wherein, x represents an integer of 0 or more; y represents an integer of 1 or more; $R^{201}$ represents a $C_{1-30}$ alkyl, a $C_{2-30}$ alkenyl, or a $C_{2-30}$ alkynyl, which may be substituted with a hydrogen atom, a halogen atom, hydroxyl or carboxyl; $R^{202}$ represents a $C_{1-30}$ alkylene, a $C_{2-30}$ alkenylene, or a $C_{2-30}$ alkynylene; wherein $R^{201}$ and $R^{202}$ may form a ring structure.)

Examples of the compound represented by Formula (1) include, for example, 3-mercaptopropyltrimethoxysilane, 3-mercaptopropyltriethoxysilane, 2-mercaptoethyltrimethoxysilane, 2-mercaptoethyltriethoxysilane, and a compound represented by Formula (4) below (Si363, manufactured by Evonik Degussa), and the compound represented by Formula (4) below can be suitably used. They may be used alone or two or more thereof may be used in combination.

[Chemical Formula 4]

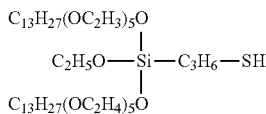

Examples of the compound comprising the bond unit A represented by Formula (2) and the bond unit B represented by Formula (3) include those commercially available from Momentive Performance Materials, and the like, for example. They may be used alone or two or more thereof may be used in combination.

A content of the silane coupling agent based on 100 parts by mass of silica when the rubber composition comprises the silane coupling agent is, from the viewpoint of enhancing the dispersibility of silica, preferably 1.0 part by mass or more, more preferably 3.0 parts by mass or more, and further preferably 5.0 parts by mass or more. Moreover, it is preferably 30 parts by mass or less, more preferably 20 parts by mass or less, and further preferably 15 parts by mass or less, from the viewpoint of preventing deterioration of abrasion resistance.

Change in hardness after thermal deterioration of the rubber layer can be appropriately adjusted by changing the type and content of the filler and silane coupling agent described above.

<Plasticizer>

The rubber composition constituting the first rubber layer is preferably compounded with plasticizers to obtain a high wet performance. Examples of a softener include a resin component, oil, a liquid polymer, an ester-based plasticizer, and the Ike, for example.

The resin component is not particularly limited, and examples thereof include a petroleum resin, a terpene-based resin, a rosin-based resin, a phenol-based resin, and the like being commonly used in the tire industry. These resin components may be used alone or two or more thereof may be used in combination.

Examples of the petroleum resin include a C5-based petroleum resin, an aromatic-based petroleum resin, and a C5-C9-based petroleum resin, for example. These petroleum resins may be used alone or two or more thereof may be used in combination.

In the specification, the "C5-based petroleum resin" refers to a resin obtained by polymerizing a C5 fraction. Examples of the C5 fraction include, for example, a petroleum fraction equivalent to 4 to 5 carbon atoms such as cyclopentadiene, pentene, pentadiene, isoprene, and the like. As the C5-based petroleum resin, a dicyclopentadiene resin (DCPD resin) is suitably used.

In the specification, the "aromatic-based petroleum resin" refers to a resin obtained by polymerizing a C9 fraction, and may be hydrogenated or modified. Examples of the C9 fraction include, for example, a petroleum fraction equivalent to 8 to 10 carbon atoms such as vinyltoluene, alkylstyrene, indene, and methyl indene. As specific examples of the aromatic-based petroleum resin, for example, a coumarone indene resin, a coumarone resin, an indene resin, and an aromatic vinyl-based resin are suitably used. As the aromatic vinyl-based resin, a homopolymer of α-methylstyrene or styrene or a copolymer of α-methylstyrene and styrene is preferable, and a copolymer of α-methylstyrene and styrene is more preferable, because it is economical, easy to be processed, and good in heat generation. As the aromatic vinyl-based resin, for example, those commercially available from Kraton Corporation, Eastman Chemical Company, etc. can be used.

In the specification, a "C5-C9-based petroleum resin" refers to a resin obtained by copolymerizing the C5 fraction and the C9 fraction, and may be hydrogenated or modified. Examples of the C5 fraction and the C9 fraction include the above-described petroleum fractions. As the C5-C9-based petroleum resin, for example, those commercially available from Tosoh Corporation, Zibo Luhua Hongjin New Material Co., Ltd., etc., can be used.

Examples of the terpene-based resin include a polyterpene resin consisting of at least one selected from terpene compounds such as α-pinene, β-pinene, limonene, and dipentene; an aromatic-modified terpene resin made from the terpene compound and an aromatic compound; a terpene phenol resin made from a terpene compound and a phenol-based compound; and those obtainable by hydrogenating these terpene-based resins (hydrogenated terpene-based resins). Examples of the aromatic compound used as a raw material for the aromatic-modified terpene resin include, for example, styrene, α-methylstyrene, vinyltoluene, divinyltoluene, and the like. Examples of the phenol-based compound used as a raw material for the terpene phenol resin include, for example, phenol, bisphenol A, cresol, xylenol, and the like.

The rosin-based resin is not particularly limited, and examples thereof include, for example, a natural resin rosin, and a rosin modified resin being the natural resin rosin modified by hydrogenation, disproportionation, dimerization, or esterification.

The phenol-based resin is not particularly limited, and examples thereof include a phenolformaldehyde resin, an alkylphenolformaldehyde resin, an alkylphenol acetylene resin, an oil-modified phenolformaldehyde resin, and the like.

A softening point of the resin component is preferably 60° C. or higher and more preferably 65° C. or higher, from the viewpoint of grip performance. Moreover, it is preferably 150° C. or lower, more preferably 140° C. or lower, and further preferably 130° C. or lower, from the viewpoints of processability and improvement in dispersibility of a rubber component with a filler. Besides, in the specification, the softening point can be defined as a temperature at which a sphere drops when the softening point specified in Japanese Industrial Standard JIS K 6220-1: 2001 is measured with a ring and ball softening point measuring device.

When the rubber composition comprises the resin component, the content thereof based on 100 parts by mass of the rubber component is, from the viewpoints of riding comfort performance and wet performance, preferably 1.0 part by mass or more, more preferably 1.5 parts by mass or more, and further preferably 2.0 parts by mass or more. Moreover, it is preferably 50 parts by mass or less, more preferably 40 parts by mass or less, further preferably 30 parts by mass or less, and particularly preferably 20 parts by mass or less, from the viewpoint of abrasion resistance.

Examples of oil include, for example, a process oil, a vegetable oil and fat, an animal oil and fat, and the like. Examples of the process oil include a paraffin-based process oil, a naphthene-based process oil, an aromatic-based process oil, and the like. Moreover, as an environmental measure, a process oil having a low content of a polycyclic aromatic compound (PCA) can also be used. Examples of the process oil having a low content of a PCA include a treated distillate aromatic extract (TDAE), which is an oil aromatic-based process oil being reextracted; an aromatic substitute oil being a mixed oil of asphalt and naphthenic oil; mild extraction solvates (MES); a heavy naphthenic oil; and the like.

When the rubber composition comprises the oil, the content thereof based on 100 parts by mass of the rubber component is, from the viewpoint of processability, preferably 1 part by mass or more, more preferably 2 parts by mass or more, and further preferably 3 parts by mass or more. Moreover, it is preferably 90 parts by mass or less, more preferably 80 parts by mass or less, and further preferably 75 parts by mass or less, from the viewpoints of fuel efficiency and durability. Besides, in the specification, the content of oil also includes an amount of oil contained in an oil-extended rubber.

Examples of the liquid polymer include, for example, a liquid styrene-butadiene polymer, a liquid butadiene polymer, a liquid isoprene polymer, a liquid styrene-isoprene polymer, a liquid farnesene rubber, and the like, and is preferably the liquid farnesene rubber. These may be used alone or two or more thereof may be used in combination.

The liquid farnesene rubber can be a homopolymer of farnesene (farnesene homopolymer) or a copolymer of farnesene and a vinyl monomer (farnesene-vinyl monomer copolymer). Examples of the vinyl monomer include aromatic vinyl compounds such as styrene, 2-methylstyrene, 3-methylstyrene, 4-methylstyrene, α-methylstyrene, 2,4-dimethylstyrene, 2,4-diisopropyl styrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethylether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridyne, diphenylethylene, tertiary amino group containing diphenylethylene, and the like; and conjugated diene compounds such as butadiene, isoprene, and the like. Among these, styrene and butadiene are preferable. In other words, as the copolymer of farnesene and the vinyl monomer, a copolymer of farnesene and styrene (farnesene-styrene copolymer) and a copolymer of farnesene and butadiene (farnesene-butadiene copolymer) are preferable. The farnesene-styrene copolymer can be compounded to increase an effect of improving wet performance, and the farnesene-butadiene copolymer can be compounded to increase an effect of improving fuel efficiency and abrasion resistance.

When the rubber composition comprises the liquid polymer, the content thereof based on 100 parts by mass of the rubber component is preferably 5 parts by mass or more, more preferably 10 parts by mass or more, further preferably 15 parts by mass or more, and particularly preferably 20 parts by mass or more. Moreover, a content of the liquid polymer is preferably 50 parts by mass or less, more preferably 45 parts by mass or less, and further preferably 40 parts by mass or less.

When the rubber composition comprises the plasticizer, a content of the plasticizer (when the plasticizer is used in a plurality in combination, a total content of all of the plasticizers) based on 100 parts by mass of the rubber component is preferably 10 parts by mass or more, more preferably 20 parts by mass or more, further preferably 30 parts by mass or more, and particularly preferably 35 parts by mass or more, from the viewpoint of wet performance. Moreover, it is preferably 130 parts by mass or less, more preferably 110 parts by mass or less, and further preferably 95 parts by mass or less, from the viewpoint of processability.

<The Other Components>

The rubber composition constituting the first rubber layer can appropriately comprise compounding agents commonly used in the tire industry, such as, for example, an antioxidant, wax, stearic acid, zinc oxide, a vulcanizing agent, a vulcanization accelerator, and the like, in addition to the previously-described components.

The antioxidant is not particularly limited, and examples thereof include, for example, each amine-based, quinoline-based, quinone-based, phenol-based, and imidazole-based compound, and an antioxidant such as a carbamate metal salt, preferably a phenylenediamine-based antioxidant such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, and N-cyclohexyl-N'-phenyl-p-phenylenediamine, and a quinoline-based antioxidant such as 2,2,4-trimethyl-1,2-dihydroquinolin polymer and 6-ethoxy-2,2,4-trimethyl-1,2-dihydroquinolin. These antioxidants may be used alone or two or more thereof may be used in combination.

When the rubber composition comprises the antioxidant, the content thereof based on 100 parts by mass of the rubber component is, from the viewpoint of ozone crack resistance of a rubber, preferably 0.5 parts by mass or more and more preferably 1 part by mass or more. Moreover, it is preferably 10 parts by mass or less and more preferably 5 parts by mass or less, from the viewpoints of abrasion resistance and wet performance.

When the rubber composition comprises the wax, the content thereof based on 100 parts by mass of the rubber component is, from the viewpoint of weather resistance of a rubber, preferably 0.5 parts by mass or more and more preferably 1 part by mass or more. Moreover, it is preferably 10 parts by mass or less and more preferably 5 parts by mass or less, from the viewpoint of preventing whitening of a tire due to bloom.

When the rubber composition comprises the stearin acid, the content thereof based on 100 parts by mass of the rubber component is, from the viewpoint of vulcanization rate, preferably 0.2 parts by mass or more and more preferably 1 part by mass or more. Moreover, it is preferably 10 parts by mass or less and more preferably 5 parts by mass or less, from the viewpoint of processability.

When the rubber composition comprises the zinc oxide, the content thereof based on 100 parts by mass of the rubber component is, from the viewpoint of vulcanization rate, preferably 0.5 parts by mass or more and more preferably 1 part by mass or more. Moreover, it is preferably 10 parts by mass or less and more preferably 5 parts by mass or less, from the viewpoint of abrasion resistance.

Sulfur is suitably used as the vulcanizing agent. As sulfur, a powdered sulfur, an oil-treated sulfur, a precipitated sulfur, a colloidal sulfur, an insoluble sulfur, a highly dispersible sulfur, and the like can be used.

A content of sulfur based on 100 parts by mass of the rubber component when the rubber composition comprises sulfur as the vulcanizing agent is preferably 0.1 parts by mass or more, more preferably 0.3 parts by mass or more, and further preferably 0.5 parts by mass or more, from the viewpoint of securing a sufficient vulcanization reaction. Moreover, it is preferably 5.0 parts by mass or less, more preferably 4.0 parts by mass or less, and further preferably 3.0 parts by mass or less, from the viewpoint of preventing deterioration. Besides, a content of a vulcanizing agent when using an oil-containing sulfur as the vulcanizing agent shall be a total content of pure sulfur amounts comprised in the oil-containing sulfur.

Examples of vulcanizing agents other than sulfur include, for example, alkylphenol-sulfur chloride condensate, 1,6-hexamethylene-sodium dithiosulfate dehydrate, 1,6-bis(N, N'-dibenzylthiocarbamoyldithio)hexane, and the like. As these vulcanizing agents other than sulfur, those commercially available from Taoka Chemical Co., Ltd., LANXESS, Flexsys, etc. can be used.

The vulcanization accelerator is not particularly limited, and examples of the vulcanization accelerators include, for example, sulfenamide-based, thiazole-based, thiuram-based, thiourea-based, guanidine-based, dithiocarbamic acid-based, aldehyde-amine-based or aldehyde-ammonia-based, imidazoline-based, and xanthate-based vulcanization accelerators, and, among them, sulfonamide-based, thiazole-based, and guanidine-based vulcanization accelerators are preferable from the viewpoint that desired effects are more suitably obtained.

Examples of the sulfonamide-based vulcanization accelerator include, for example, N-cyclohexyl-2-benzothiazolylsulfenamide (CBS), N-tert-butyl-2-benzothiazolylsulfenamide (TBBS), N-oxyethylene-2-benzothiazolylsulfenamide, N,N'-diisopropyl-2-benzothiazolylsulfenamide, N,N-dicyclohexyl-2-benzothiazolylsulfenamide, and the like. Examples of the thiazole-based vulcanization accelerator include 2-mercaptobenzothiazole, dibenzothiazolyl disulfide, and the like. Examples of the guanidine-based vulcanization accelerator include diphenylguanidine (DPG), di-o-tolylguanidine, o-tolylbiguanidine, and the like. These vulcanization accelerators may be used alone or two or more thereof may be used in combination.

When the rubber composition comprises the vulcanization accelerator, the content thereof based on 100 parts by mass of the rubber component is preferably 1.0 part by mass or more, more preferably 1.5 parts by mass or more, and further preferably 2.0 parts by mass or more. Moreover, the content of the vulcanization accelerator based on 100 parts by mass of the rubber component is preferably 8.0 parts by mass or less, more preferably 7.0 parts by mass or less, further preferably 6.0 parts by mass or less, and particularly preferably 5.0 parts by mass or less. When the content of the vulcanization accelerators is within the above-described ranges, there is a tendency to be able to secure breaking strength and elongation.

Change in hardness after thermal deterioration of the rubber layer can be appropriately adjusted by changing the type and content of the vulcanizing agent and vulcanization accelerator described above.

[Second Rubber Layer]

The rubber composition constituting the second rubber layer will be described below.

<Rubber Component>

The rubber composition constituting the second rubber layer preferably comprises at least one selected from the group consisting of an isoprene-based rubber, a styrene-butadiene rubber (SBR), and a butadiene rubber (BR) as rubber components. The rubber component may be a rubber component comprising an isoprene-based rubber and a BR, and may be a rubber component comprising an isoprene-based rubber, a SBR, and a BR. Moreover, the rubber component may be a rubber component consisting only of an isoprene-based rubber and a BR, or may be a rubber component consisting only of an isoprene-based rubber, a SBR, and a BR.

When the rubber composition comprises the isoprene-based rubber, a content of the isoprene-based rubber in 100% by mass of the rubber component is, from the viewpoint of steering stability performance, preferably 30% by mass or more, more preferably 40% by mass or more, and further preferably 50% by mass or more. Moreover, a content of the isoprene-based rubber in the rubber component is preferably 90% by mass or less, more preferably 85% by mass or less, and further preferably 80% by mass or less.

A content of the SBR in 100% by mass of the rubber component when the rubber composition comprises the SBR is preferably 50% by mass or less, more preferably 45% by mass or less, further preferably 40% by mass or less, and particularly preferably 35% by mass or less. Moreover, a lower limit of a content of the SBR when the rubber composition comprises the SBR is not particularly limited and may be 1% by mass or more, 3% by mass or more, 5% by mass or more, 10% by mass or more, or 15% by mass or more, for example.

A content of the BR in 100% by mass of the rubber component when the rubber composition comprises the BR is preferably 50% by mass or less, more preferably 45% by mass or less, further preferably 40% by mass or less, and particularly preferably 35% by mass or less. Moreover, a lower limit of a content of the BR when the rubber composition comprises the BR is not particularly limited and may be 1% by mass or more, 3% by mass or more, 5% by mass or more, 10% by mass or more, or 15% by mass or more, for example.

<Filler>

The rubber composition constituting the second rubber layer preferably comprises carbon black and/or silica as a filler. Moreover, the filler may be a filler consisting only of carbon black and silica, or may be a filler composed of only carbon black. Furthermore, as the filler, the other fillers other than carbon black and silica may be used. As carbon black, silica, the silane coupling agent, and the other fillers, those being similar to the rubber composition constituting the first rubber layer may be suitably used in a similar aspect.

When the rubber composition comprises the carbon black, the content thereof based on 100 parts by mass of the rubber component is, from the viewpoints of weather resistance and reinforcing property, preferably 20 parts by mass or more, more preferably 25 parts by mass or more, further preferably 30 parts by mass or more, and particularly preferably 35 parts by mass or more. Moreover, while an upper limit of the content of the carbon black is not particularly limited, from the viewpoint of fuel efficiency and processability, it is preferably 120 parts by mass or less, more preferably 100 parts by mass or less, and further preferably 90 parts by mass or less.

When the rubber composition comprises the silica, the content thereof based on 100 parts by mass of the rubber component is preferably 30 parts by mass or less, more preferably 25 parts by mass or less, and further preferably 20 parts by mass or less. Moreover, while a lower limit of the content of the silica when the rubber composition comprises the silica is not particularly limited, it may be 1 part by mass or more, 3 parts by mass or more, parts by mass or more, 10 parts by mass or more, or 15 parts by mass or more, for example.

<The Other Components>

The rubber composition constituting the second rubber layer can appropriately comprise, as needed, compounding agents and additives conventionally used in the tire industry, such as, for example, a plasticizer, an antioxidant, wax, stearic acid, zinc oxide, a vulcanizing agent, a vulcanization accelerator, and the like, in addition to the previously-described rubber components and filler. As the previously-described compounding agents and additives, those being similar to the rubber composition constituting the first rubber layer may be suitably used in a similar aspect.

A difference ($AE_T - AE_B$) between an acetone extraction amount $AE_T$ of the rubber composition constituting the first rubber layer and an acetone extraction amount $AE_B$ of the rubber composition constituting the second rubber layer is preferably −10 to 5% by mass, more preferably −10 to 0% by mass, and further preferably −8 to −2% by mass. It is considered that the difference in the acetone extraction amounts being set within the previously-mentioned range makes it easy to transfer the acetone extraction component such as an oil and the like from the second rubber layer to the first rubber layer during traveling due to the concentration gradient and makes it possible to maintain the flexibility of the first rubber layer even after wear.

A ratio ($AE_T/AE_B$) of the acetone extraction amount $AE_T$ of the rubber composition constituting the first rubber layer with respect to an acetone extraction amount $AE_B$ of the rubber composition constituting the second rubber layer is preferably 0.95 to 1.05, and more preferably 0.95 to 1.00. It is considered that the ratio of the acetone extraction amounts being set within the previously-mentioned range makes it easy to transfer the acetone extraction component such as an oil and the like from the second rubber layer to the first rubber layer during traveling due to the concentration gradient and makes it possible to maintain the flexibility of the first rubber layer even after wear.

Besides, the acetone extraction amount is to be an indicator of the concentration of an organic low-molecular compound within a plasticizer comprised in the vulcanized rubber composition. In accordance with Japanese Industrial Standard JIS K 6229-3:2015, the acetone extraction amount can be determined using the below-described equation by soaking each of vulcanized rubber test pieces in acetone for 24 hours to extract the soluble component and measuring mass of each of the vulcanized rubber test pieces before and after extraction:

Acetone extraction amount (%)={(Mass of rubber test piece before extraction-mass of rubber test piece after extraction)/(Mass of rubber test piece before extraction)}×100.

The content of the plasticizer based on 100 parts by mass of the rubber component constituting the second rubber layer is preferably greater than the content of the plasticizer based on 100 parts by mass of the rubber component constituting the first rubber layer. Increasing the content of the plasticizer in the second rubber layer makes it easy for the plasticizer to be transferred to the first rubber layer during traveling and makes it possible to maintain the flexibility of the first rubber layer even after wear.

The rubber composition according to the present disclosure can be manufactured by a known method. For example, it can be manufactured by kneading each of the previously-described components using a rubber kneading apparatus such as an open roll and a closed type kneader (Bunbury mixer, kneader, etc.).

The kneading step comprises, for example, a base kneading step of kneading compounding agents and additives other than vulcanizing agents and vulcanization accelerators, and a final kneading (F kneading) step of adding vulcanizing agents and vulcanization accelerators to the kneaded product obtained in the base kneading step and kneading them. Furthermore, the base kneading step can be divided into a plurality of steps, if desired. Kneading conditions are not particularly limited, and, for example, a method of kneading at a discharge temperature of 150 to 170° C. for 3 to 10 minutes in the base kneading step and kneading at 70 to 110° C. for 1 to 5 minutes in the final kneading step is exemplified.

[Tire]

The tire according to the present disclosure comprises a tread preferably composed of the first rubber layer and the second rubber layer and may be a pneumatic tire or a non-pneumatic tire. Moreover, examples of the pneumatic tire include a tire for a passenger car, a tire for a truck/bus, a tire for a motorcycle, a high-performance tire, and the like. Besides, the high-performance tire in the specification is a tire having a particularly good grip performance and is a concept even including a racing tire used for a racing vehicle.

The tire comprising the tread composed of the first rubber layer and the second rubber layer can be manufactured by a usual method using the previously-described rubber composition. In other words, the tire can be manufactured by extruding unvulcanized rubber compositions compounded with each of the above-described components based on the rubber component as necessary into shapes of the tread, attaching them together with other tire members on a tire molding machine, and molding them by a usual method to form an unvulcanized tire, followed by heating and pressurizing this unvulcanized tire in a vulcanizing machine.

EXAMPLE

Although the present disclosure will be described based on Examples, it is not to be limited to these Examples.

Various chemicals used in Examples and Comparative examples are shown below:

NR: TSR20

SBR: Tufdene 4850 (non-modified S-SBR, styrene content: 40% by mass, vinyl content: 46 mol %, Mw: 350,000, comprises 50 parts by mass of an oil content based on 100 parts by mass of a rubber solid content), manufactured by Asahi Kasei Corporation BR: UBEPOL BR (registered trademark) 150B (vinyl content: 1.5 mol %, cis content: 97% by mass, Tg: −108° C., Mw: 440,000), manufactured by Ube Industries, Ltd.

Carbon black: Show Black N330 ($N_2SA$: 75 $m^2/g$, DBP oil absorption amount: 102 ml/100 g), manufactured by Cabot Japan K.K.

Silica: Ultrasil VN3 ($N_2SA$: 175 $m^2/g$, average primary particle size: 15 nm), manufactured by Evonik Degussa Silane coupling agent: NXT-Z45 (mercapto-based silane coupling agent), manufactured by Momentive Performance Materials Resin component: PetroTac 100V (C5-C9-based petroleum resin, softening point: 96° C., Mw: 3,800, SP value: 8.3), manufactured by Tosoh Corporation Liquid polymer: FB-823 (farnesene-butadiene copolymer, copolymerization ratio on a mass basis: farnesene/butadiene=80/20, Mw: 50,000, Tg: −78° C.), manufactured by Kuraray Co., Ltd.

Oil: Vivatec 500 (TDAE oil), manufactured by H&R Group

Antioxidant: Antigen 6C (N-(1,3-dimethylbutyl)-N'-phenyl-p-phenylenediamine), manufactured by Sumitomo Chemical Co., Ltd.

Wax: Sunnock N, manufactured by Ouchi Shinko Chemical Industrial Co., Ltd.

Stearic add: Bead stearic add "Tsubaki", manufactured by NOF CORPORATION

Zinc oxide: Zinc oxide No. 2, manufactured by Mitsui Mining & Smelting Co., Ltd.

Sulfur: Powdered sulfur, manufactured by Karuizawa Iou Kabushiki Kaisha

Vulcanization accelerator: Nocceler CZ (N-cyclohexyl-2-benzothiazolylsulfenamide), manufactured by Ouchi Shinko Chemical Industrial Co., Ltd.

EXAMPLES AND COMPARATIVE EXAMPLES

According to the compounding formulations shown in Tables 1 and 2, using a 1.7 L dosed Banbury mixer, chemicals other than the sulfur and vulcanization accelerator were kneaded for 1 to 10 minutes until a discharge temperature reached 150 to 160° C. to obtain a kneaded product. Next, using a twin-screw open roll, the sulfur and vulcanization accelerator were added to the obtained kneaded product, and the mixture was kneaded for 4 minutes until the temperature reached 105° C. to obtain an unvulcanized rubber composition. The obtained unvulcanized rubber composition was extruded into shapes of a cap tread (first rubber layer, thickness: 7 mm) and a base tread (second rubber layer, thickness: 3 mm) and attached together with other tire members to produce an unvulcanized tire, followed by vulcanization at 170° C. to obtain a test tire (size: 205/65R15, rim: 15×6.0 J, internal pressure: 230 kPa). Table 3 shows a tire in which the tread part 2 does not have a sunken groove and the shape in plan view and the cross-sectional shape of the main groove 3 are in any one of FIGS. 2 to 7. Table 4 shows a tire in which the tread part 2 has the sunken groove 4 and the sipe 5 (see FIG. 8). In each of the tires, $S_{50}/S_0$ was adjusted by changing the shape of the main groove and the sunken groove.

The ground contact shape of a tire was obtained by mounting each of test tires to a normal rim, and then applying ink to the tread part, and vertically pressing the tread part against paper, with a load of 70% of the maximum bad capability, and transferring thereto ink applied to the tread part. The sea ratio $S_0$ was calculated by setting an area obtained by an outer ring of the ground contact shape obtained to be the total of the tread ground contact area with all grooves thereof being buried and determining the total of the groove area for all grooves that can remain when the main groove is worn to 50% of the portion to which ink is not affixed. Moreover, with the similar technique as what is described above, the sea ratio $S_{50}$ was calculated by determining the total of the tread ground contact area with all grooves of the tread part as when the main groove is worn to 50% being buried and the total of the groove area for grooves that remain then. Besides, the base tread (the second rubber layer) is not exposed when the main groove is worn to 50%.

<Measurement of Acetone Extraction Amounts (AE Amounts) of First Rubber Layer and Second Rubber Layer>

Each of vulcanized rubber test pieces was soaked in acetone for 24 hours to extract the soluble component. Mass of each of the vulcanized rubber test pieces before and after extraction was measured and the acetone extraction amount was calculated using the below-described calculation equation:

Acetone extraction amount (%)={(Mass of rubber test piece before extraction-Mass of rubber test piece after extraction)/(Mass of rubber test piece before extraction)}×100.

Besides, for each of the rubber test pieces of the first rubber layer and the second rubber layer, what was cut out from the tread of each of the test tires was used. Values of the difference ($AE_T-AE_B$) between the acetone extraction amount $AE_T$ of the rubber composition constituting the first rubber layer and the acetone extraction amount $AE_B$ of the rubber composition constituting the second rubber layer are shown in Tables 3 and 4.

<Measurement of Rubber Hardness as when the Tire is Newly Used and After Thermal Deterioration>

The rubber hardness $Hs_0$ was measured by pressing a type A durometer against a rubber piece from the ground contact surface (tread surface) side at 23° C. in accordance with JIS K 6253-3:2012, which the rubber piece is obtained by cutting out all the rubber forming the tread part in a tire radial direction from a land part closest to the equatorial plane of the tire being newly used. Moreover, the rubber hardness $Hs_{50}$ was measured by pressing a type A durometer against a rubber piece from the ground contact surface side, which the rubber piece is obtained by subjecting the rubber piece of the new tire to heat aging in an atmosphere of 80° C. for 168 hours and allowing it to cool to 23° C. Values of $Hs_{50}/Hs_0$ of each of the test tires are shown in Tables 3 and 4.

<Riding Comfort Maintenance Performance After Wear>

Each of the test tires as at when the tire is newly used and each of the test tires after wear were mounted to all wheels of a domestic FF vehicle with a displacement of 2,000 cc, and the actual vehicle was made to run on a test course having a dry asphalt surface. Riding comfort performance was evaluated based on feeling at each of the times of running straight, changing lanes, and accelerating/decelerating when running at 120 km/h by a test driver. Evaluation was performed using an integer value of 1 to 10 points, and a total score by 10 test drivers was calculated based on evaluation criteria in which the higher the score, the better the riding comfort performance. For each of the test tires, a maintenance index of the score for the riding comfort performance before and after wear was calculated using the below-described equations, the maintenance index was converted with the maintenance index of a reference tire (Comparative example 2 in Table 3 and Comparative example 10 in Table 4) as 100 to be set as the riding comfort maintenance performance after wear of each of the test tires. The higher the score, the smaller the change in the riding comfort performance before and after wear, so that the riding comfort performance as when the tire is newly used is maintained and is good.

(Riding comfort performance maintenance index of reference tire)=(Riding comfort performance score of reference tire after wear)/(Riding comfort performance score of reference tire as when the tire is newly used)

(Riding comfort performance maintenance index of each of test tires)=(Riding comfort performance score of each of test tires after wear)/(Riding comfort performance score of each of test tires as when the tire is newly used)

(Riding comfort maintenance performance of each of test tires)=(Riding comfort performance maintenance index of each of test tires)/(Riding comfort performance maintenance index of reference tire)×100.

Besides, each of the test tires after wear was produced by having the tread part worn so that the depth of the deepest main groove of the new tire is 50% of that when it is newly used, and then subjecting this tire to thermal deterioration at 80° C. for 7 days (the same below).

<Wet Performance Maintenance Performance After Wear>

Each of the test tires as at when the tire is newly used and each of the test tires after wear were mounted to all wheels of a domestic FF vehicle with a displacement of 2,000 cc, and the actual vehicle was made to run on a test course having a wet asphalt surface. Wet performance was evaluated based on feeling for each of wet grip and drainability (hydroplaning) when running at 120 km/h by a test driver. Evaluation was performed using an integer value of 1 to 10 points, and a total score by 10 test drivers was calculated based on evaluation criteria in which the higher the score, the better the wet performance. For each of the test tires, a maintenance index of the score for the wet performance before and after wear was calculated using the below-described equations, the maintenance index was converted with the maintenance index of a reference tire (Comparative example 2 in Table 3 and Comparative example 10 in Table 4) as 100 to be set as the wet performance maintenance performance after wear of each of the test tires. The higher the score, the smaller the change in the wet performance before and after wear, so that the wet performance as when the tire is newly used is maintained and is good.

(Wet performance maintenance index of reference tire)=(Wet performance score of reference tire after wear)/(Wet performance score of reference tire as when the tire is newly used)

(Wet performance maintenance index of each of test tires)=(Wet performance score of each of test tires after wear)/(Wet performance score of each of test tires as when the tire is newly used)

(Wet performance maintenance performance of each of test tires)=(Wet performance maintenance index of each of test tires)/(Wet performance maintenance index of reference tire)×100.

For the overall performance of the riding comfort maintenance performance and the wet performance maintenance performance (the total sum of the riding comfort maintenance performance index and the wet performance maintenance performance index), over 200 is to be the performance target value.

TABLE 1

| | Manufacturing example | | |
|---|---|---|---|
| First rubber layer | A | B | C |
| Compounding amount (part by mass) | | | |
| NR | 10 | 10 | 10 |
| SBR | 55 | 55 | 55 |
| BR | 35 | 35 | 35 |
| Carbon black | 5.0 | 5.0 | 5.0 |
| Silica | 80 | 80 | 80 |
| Silane coupling agent | 6.5 | 6.5 | 6.5 |
| Resin component | 5.0 | 5.0 | 5.0 |
| Liquid polymer | — | 10 | 20 |
| Oil | 40 | 30 | 20 |
| Antioxidant | 2.0 | 2.0 | 2.0 |
| Wax | 2.0 | 2.0 | 2.0 |
| Stearic acid | 2.0 | 2.0 | 2.0 |
| Zinc oxide | 2.0 | 2.0 | 2.0 |
| Sulfur | 1.0 | 1.0 | 1.0 |
| Vulcanization accelerator | 2.0 | 2.0 | 2.0 |

TABLE 2

| | Manufacturing example | |
|---|---|---|
| Second rubber layer | a | b |
| Compounding amount (part by mass) | | |
| NR | 75 | 75 |
| BR | 25 | 25 |
| Carbon black | 40 | 40 |
| Liquid polymer | 5.0 | 5.0 |
| Oil | 15 | 25 |
| Antioxidant | 2.0 | 2.0 |
| Wax | 2.0 | 2.0 |
| Stearic acid | 2.0 | 2.0 |
| Zinc oxide | 2.0 | 2.0 |
| Sulfur | 2.5 | 3.0 |
| Vulcanization accelerator | 1.5 | 2.0 |

TABLE 3-1

| | Comparative example | | | | | | | |
|---|---|---|---|---|---|---|---|---|
| | 1 | 2 | 3 | 4 | 5 | 6 | 7 | 8 |
| First rubber layer | A | A | A | B | B | C | A | A |
| Second rubber layer | a | a | a | a | b | b | a | a |
| $AE_T$-$AE_B$ (% by mass) | 9.0 | 9.0 | 9.0 | 5.0 | 0 | -4.0 | 9.0 | 9.0 |
| $Hs_{50}/Hs_0$ | 1.05 | 1.05 | 1.05 | 1.03 | 1.00 | 0.97 | 1.05 | 1.05 |
| Shape of main groove in plan view | FIG. 2 | FIG. 2 | FIG. 2 | FIG. 2 | FIG. 2 | FIG. 2 | FIG. 6 | FIG. 4 |
| Cross-sectional shape of main groove | FIG. 3 | FIG. 3 | FIG. 3 | FIG. 3 | FIG. 3 | FIG. 3 | FIG. 7 | FIG. 5 |
| Amount of recess d1 of deepest part of first recessed part/Groove width W1 of main groove | — | — | — | — | — | — | 0.15 | 0.10 |
| Amount of recess d2 of deepest part of second recessed part/Groove width W1 of main groove | — | — | — | — | — | — | — | 0.05 |
| Total amount of recess of main groove/Groove width W1 of main groove | 0.04 | 0.20 | 1.00 | 0.04 | 0.04 | 0.04 | 0.15 | 0.15 |
| $S_0$ | 30.0 | 30.0 | 30.0 | 30.0 | 30.0 | 30.0 | 30.0 | 30.0 |
| $S_{50}$ | 30.6 | 33.0 | 45.0 | 30.6 | 30.6 | 30.6 | 32.3 | 32.3 |
| $S_{50}/S_0$ | 1.02 | 1.10 | 1.50 | 1.02 | 1.02 | 1.02 | 1.08 | 1.08 |
| | Index | | | | | | | |
| Riding comfort maintenance performance after wear | 96 | 100 | 95 | 97 | 98 | 100 | 94 | 91 |
| Wet performance maintenance performance after wear | 95 | 100 | 93 | 98 | 97 | 98 | 90 | 85 |
| Total performance | 191 | 200 | 188 | 195 | 195 | 198 | 184 | 176 |

TABLE 3-2

| | Example | | | | | | |
|---|---|---|---|---|---|---|---|
| | 1 | 2 | 3 | 4 | 5 | 6 | 7 |
| First rubber layer | B | B | B | C | C | C | B |
| Second rubber layer | a | a | b | b | b | b | — |
| $AE_T$-$AE_B$ (% by mass) | 5.0 | 5.0 | 0 | -4.0 | -4.0 | -4.0 | — |
| $Hs_{50}/Hs_0$ | 1.03 | 1.03 | 1.00 | 0.97 | 0.97 | 0.97 | 1.03 |
| Shape of main groove in plan view | FIG. 2 | FIG. 2 | FIG. 2 | FIG. 2 | FIG. 6 | FIG. 4 | FIG. 2 |
| Cross-sectional shape of main groove | FIG. 3 | FIG. 3 | FIG. 3 | FIG. 3 | FIG. 7 | FIG. 5 | FIG. 3 |
| Amount of recess d1 of deepest part of first recessed part/Groove width W1 of main groove | — | — | — | — | 0.40 | 0.50 | — |
| Amount of recess d2 of deepest part of second recessed part/Groove width W1 of main groove | — | — | — | — | — | 0.10 | — |
| Total amount of recess of main groove/Groove width W1 of main groove | 0.20 | 0.60 | 0.60 | 0.60 | 0.40 | 0.60 | 0.60 |
| $S_0$ | 30.0 | 30.0 | 30.0 | 30.0 | 30.0 | 30.0 | 30.0 |
| $S_{50}$ | 33.0 | 39.0 | 39.0 | 39.0 | 39.0 | 39.0 | 39.0 |
| $S_{50}/S_0$ | 1.10 | 1.30 | 1.30 | 1.30 | 1.30 | 1.30 | 1.30 |
| | Index | | | | | | |
| Riding comfort maintenance performance after wear | 101 | 105 | 107 | 108 | 110 | 112 | 103 |
| Wet performance maintenance performance after wear | 107 | 113 | 115 | 116 | 117 | 120 | 105 |
| Total performance | 208 | 218 | 222 | 224 | 227 | 232 | 208 |

TABLE 4

|  | Comparative example |  |  |  |  |  | Example |  |  |  |  |
|---|---|---|---|---|---|---|---|---|---|---|---|
|  | 9 | 10 | 11 | 12 | 13 | 14 | 8 | 9 | 10 | 11 | 12 |
| First rubber layer | A | A | A | B | B | C | B | B | B | C | B |
| Second rubber layer | a | a | a | a | b | b | a | a | b | b | — |
| $AE_T$-$AE_B$ (% by mass) | 9.0 | 9.0 | 9.0 | 5.0 | 0 | −4.0 | 5.0 | 5.0 | 0 | −4.0 | — |
| $Hs_{50}/Hs_0$ | 1.05 | 1.05 | 1.05 | 1.03 | 1.00 | 0.97 | 1.03 | 1.03 | 1.00 | 0.97 | 1.03 |
| $S_0$ | 30.0 | 30.0 | 30.0 | 30.0 | 30.0 | 30.0 | 30.0 | 30.0 | 30.0 | 30.0 | 30.0 |
| $S_{50}$ | 30.6 | 33.0 | 45.0 | 30.6 | 30.6 | 30.6 | 33.0 | 39.0 | 39.0 | 39.0 | 39.0 |
| $S_{50}/S_0$ | 1.02 | 1.10 | 1.50 | 1.02 | 1.02 | 1.02 | 1.10 | 1.30 | 1.30 | 1.30 | 1.30 |
| Index |  |  |  |  |  |  |  |  |  |  |  |
| Riding comfort maintenance performance after wear | 95 | 100 | 94 | 96 | 97 | 99 | 102 | 107 | 110 | 112 | 105 |
| Wet performance maintenance performance after wear | 94 | 100 | 93 | 95 | 97 | 99 | 108 | 114 | 118 | 119 | 104 |
| Total performance | 189 | 200 | 187 | 191 | 194 | 198 | 210 | 221 | 228 | 231 | 209 |

Based on the results of Tables 1 to 4, for a tire of the present disclosure comprising a tread being composed of a rubber layer in which there is little change in hardness after thermal deterioration and having a groove shape such that the sea ratio after wear with respect to the sea ratio as when the tire is newly used is within a predetermined range, it is evident that there is an improvement in the overall performance of the riding comfort maintenance performance and the wet performance maintenance performance. In other words, it is evident that there is little change in the riding comfort performance and the wet performance before and after the tread part is worn and riding comfort performance and the wet performance as when the tire is newly used are maintained.

INDUSTRIAL APPLICABILITY

With the tire of the present disclosure, there is little change in is riding comfort performance and wet performance before and after the tread part is worn, so that it is useful as a tire that can exhibit riding comfort performance and wet performance over a long period of time.

REFERENCE SIGNS LIST

1 Tire
2 Tread part
3 Main groove
4 Sunken groove
5 Sipe
6 Groove edge
7 Groove wall contour
8 Land part groove edge side portion
9 Recessed part
10 First groove wall
11 First recessed part
12 Second recessed part
13, 14 Deepest part
15 Flat surface
17 Concave surface part
18 Convex surface part
20 Second groove wall
21 Groove width gradually decreasing part

The invention claimed is:

1. A tire comprising:
a tread part provided with at least one main groove extending continuously in the tire circumferential direction, the tread part comprising a tread ground contact surface formed of a rubber composition, the rubber composition comprising a rubber component, and 30 to 130 parts by mass of silica based on 100 parts by mass of the rubber component, and the rubber component comprising 30 to 55% by mass of a styrene-butadiene rubber and 1 to 20% by mass of an isoprene-based rubber based on 100 parts by mass of the rubber component;

wherein, when a sea ratio at the tread ground contact surface of the tire being newly used is defined as $S_0$ (%) and a sea ratio when the tread part is worn so that the depth of the main groove is 50% of that of the tire being newly used is defined as $S_{50}$ (%), $S_{50}/S_0$ is 1.05 to 1.40; and wherein, when a rubber hardness measured by pressing a type A durometer against a rubber piece from the ground contact surface side at 23° C. in accordance with JIS K 6253-3:2012, which the rubber piece is obtained by cutting out all the rubber forming the tread part in a tire radial direction from a land part closest to the equatorial plane of the tire being newly used, is defined as $Hs_0$ and a rubber hardness measured by pressing a type A durometer against a rubber piece from the ground contact surface side, which the rubber piece is obtained by subjecting the rubber piece of the new tire to heat aging in an atmosphere of 80° C. for 168 hours and allowing it to cool to 23° C., is defined as $Hs_{50}$, $Hs_{50}/Hs_0$ is 0.95 to 1.04.

2. The tire of claim 1, wherein the tread part has at least a first rubber layer constituting the tread ground contact surface formed of the rubber composition and a second rubber layer being arranged adjacent on the inner side of the first rubber layer in the radial direction.

3. The tire of claim 2, wherein a difference ($AE_T$-$AE_B$) between an acetone extraction amount $AE_T$ of the rubber composition constituting the first rubber layer and an acetone extraction amount $AE_B$ of a rubber composition constituting the second rubber layer is −10 to 5% by mass.

4. The tire of claim 3, wherein the rubber composition constituting the second rubber layer comprises a liquid polymer.

5. The tire of claim 2, wherein the rubber composition constituting the first rubber layer comprises a liquid polymer.

6. The tire of claim 1,
wherein at least one groove wall of the main groove is provided with a recessed part being recessed on the outer side of a groove edge appearing on a tread of the tread part in the groove width direction; and
a total amount of recess of the main groove is 0.10 to 0.90 times the groove width being the length between groove edges of the main groove.

7. The tire of claim 1,
wherein a first groove wall being one groove wall of the main groove is provided with at least one first recessed part being recessed on the outer side of a groove edge appearing on a tread of the tread part in the groove width direction; and
the first recessed part has a deepest part being recessed most outwardly in the groove width direction in which an amount of recess from the groove edge gradually decreases toward both sides in the tire circumferential direction from the deepest part.

8. The tire of claim 7, wherein the amount of recess of the deepest part is 0.10 to 0.50 times the groove width being the length between groove edges of the main groove.

9. The tire of claim 7, wherein the first groove wall is provided with at least one second recessed part being recessed on the outer side of the groove edge in the groove width direction and having the amount of recess from the groove edge being constant in the tire circumferential direction.

10. The tire of claim 9, wherein a maximum amount of recess of the second recessed part is less than the amount of recess of the deepest part of the first recessed part.

11. The tire of claim 1, wherein $S_{50}/S_0$ is 1.10 to 1.40.

12. The tire of claim 1, wherein $Hs_{50}/Hs_0$ is 0.96 to 1.03.

13. The tire of claim 1, wherein the rubber composition further comprises a liquid polymer.

14. The tire of claim 1, wherein the rubber composition comprises 50 to 110 parts by mass of silica based on 100 parts by mass of the rubber component.

15. The tire of claim 1, wherein the rubber composition comprises 30 parts by mass or more to 95 parts by mass or less of plasticizer based on 100 parts by mass of the rubber component.

16. The tire of claim 15, wherein the plasticizer comprises a resin component, an oil, and a liquid polymer.

* * * * *